US012707415B2

(12) United States Patent
Manolakos et al.

(10) Patent No.: US 12,707,415 B2
(45) Date of Patent: Aug. 11, 2026

(54) SIMULTANEOUS PROCESSING OF MULTIPLE POSITIONING FREQUENCY LAYERS IN NR BY A UE

(71) Applicant: QUALCOMM Incorporated, San Diego, CA (US)

(72) Inventors: Alexandros Manolakos, Escondido, CA (US); Mukesh Kumar, Hyderabad (IN); Arash Mirbagheri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 18/005,327

(22) PCT Filed: Sep. 3, 2021

(86) PCT No.: PCT/US2021/049046
§ 371 (c)(1),
(2) Date: Jan. 12, 2023

(87) PCT Pub. No.: WO2022/072119
PCT Pub. Date: Apr. 7, 2022

(65) Prior Publication Data

US 2023/0354245 A1 Nov. 2, 2023

(30) Foreign Application Priority Data

Oct. 2, 2020 (GR) .............................. 20200100601

(51) Int. Cl.
*H04W 64/00* (2009.01)
*H04L 5/00* (2006.01)

(52) U.S. Cl.
CPC ........... *H04W 64/00* (2013.01); *H04L 5/0007* (2013.01)

(58) Field of Classification Search
CPC ..... H04W 64/00; H04W 72/23; H04W 24/10; H04W 8/22; G01S 5/0236; H04L 5/0007; H04L 5/0048
See application file for complete search history.

(56) References Cited

U.S. PATENT DOCUMENTS

| | | | |
|---|---|---|---|
| 2019/0052996 A1 | 2/2019 | Sahai et al. |
| 2019/0274146 A1 | 9/2019 | Tang et al. |

(Continued)

FOREIGN PATENT DOCUMENTS

| | | |
|---|---|---|
| CN | 110603840 A | 12/2019 |
| KR | 20190037049 A | 4/2019 |

OTHER PUBLICATIONS

CATT: "Discussion on PRS RSTD Measurement Requirements", 3GPP TSG-RAN4 Meeting #96-e, R4-2009845, Electronic Meeting, Aug. 17-28, 2020, Aug. 8, 2020, 9 Pages.

(Continued)

*Primary Examiner* — Siu M Lee
(74) *Attorney, Agent, or Firm* — QUALCOMM Incorporated

(57) ABSTRACT

A measurement period in which a User Equipment (UE) can be configured to take Positioning Reference Signal (PRS) measurements may include receiving PRS resources of a plurality of Positioning Frequency Layers (PFLs). To do so, the UE may tune (RF) circuitry of the UE from an active Bandwidth Part (BWP) to a frequency band of the at least one PFL, receive a plurality of PRS resources of a plurality of PFLs from one or more network nodes, and subsequent to receiving the plurality of PRS resources, re-tune the RF circuitry of the UE to the active BWP. The UE can then determine PRS measurements based on the plurality of PRS resources.

24 Claims, 16 Drawing Sheets

(56) References Cited

U.S. PATENT DOCUMENTS

| | | | | |
|---|---|---|---|---|
| 2020/0235877 | A1 | 7/2020 | Manolakos et al. | |
| 2020/0288337 | A1 | 9/2020 | Callender et al. | |
| 2021/0195452 | A1* | 6/2021 | Harada | H04L 5/0051 |
| 2021/0329618 | A1* | 10/2021 | Chervyakov | H04W 72/54 |
| 2022/0416975 | A1* | 12/2022 | Ren | G01S 5/0205 |
| 2023/0020648 | A1* | 1/2023 | Cha | G01S 5/0036 |
| 2023/0180173 | A1* | 6/2023 | Kazmi | H04L 5/001 455/456.1 |
| 2023/0262649 | A1* | 8/2023 | Si | H04L 5/0051 |
| 2023/0305099 | A1* | 9/2023 | Thomas | G01S 5/14 |
| 2023/0344504 | A1* | 10/2023 | Cha | H04B 7/06 |
| 2023/0345285 | A1* | 10/2023 | Zheng | H04W 24/10 |
| 2024/0023052 | A1 | 1/2024 | Hwang et al. | |
| 2024/0032008 | A1* | 1/2024 | Chen | H04W 72/0457 |
| 2024/0089046 | A1* | 3/2024 | Saraf | H04W 72/12 |
| 2024/0259853 | A1* | 8/2024 | El Hamss | G01S 5/0236 |
| 2024/0284389 | A1* | 8/2024 | Zheng | H04W 76/20 |
| 2024/0284390 | A1* | 8/2024 | Si | H04W 64/00 |
| 2024/0284391 | A1* | 8/2024 | Si | H04W 24/10 |
| 2025/0247728 | A1* | 7/2025 | Cui | H04B 7/18513 |

OTHER PUBLICATIONS

Intel Corporation: "Further Discussion on NR PRS RSTD Requirements", 3GPP TSG-RAN WG4 Meeting # 95-e, R4-2006556, 3rd Generation Partnership Project (3GPP), Mobile Competence Centre, 650, Route Des Lucioles, F-06921, Sophia-Antipolis Cedex, France, vol. RAN WG4, No. Electronic Meeting, May 25, 2020-Jun. 5, 2020, May 15, 2020, XP051883633, May 16, 2020, 18 pages, See Sections 3, 4.

Intel Corporation: "Further Discussion on NR PRS RSTD Requirements for UE", 3GPP TSG-RAN WG4 Meeting #94-e, R4-2000389, Electronic Meeting, Feb. 24-Mar. 6, 2020, Feb. 15, 2020, 18 Pages, See Section 3.

Qualcomm Incorporated: "On DL PRS RSTD Measurements in NR Positioning", 3GPP TSG-RAN WG4 Meeting #93, R4-1915178, Reno, NV, USA, Nov. 18-22, 2019, Nov. 9, 2019, pp. 1-7.

Ericsson: "On PRS RSTD Measurements", 3GPP Draft, R4-2007944, 3GPP TSG-RAN WG4 Meeting #95-e, 3rd Generation Partnership Project (3GPP), Mobile Competence Centre, 650, Route Des Lucioles, F-06921 Sophia-Antipolis Cedex, France, vol. RAN WG4, no. Electronic Meeting, May 25, 2020-Jun. 5, 2020, May 15, 2020 (May 15, 2020), XP051884784, 6 Pages, Section 2.

International Search Report and Written Opinion—PCT/US2021/049046—ISA/EPO—Dec. 22, 2021.

Qualcomm Incorporated: "On DL PRS RSTD Measurements in NR Positioning", 3GPP Draft, R4-1915178, 3GPP TSG-RAN WG4 Meeting #93, 3rd Generation Partnership Project (3GPP), Mobile Competence Centre, 650, Route Des Lucioles, F-06921 Sophia-Antipolis Cedex, France, vol. RAN WG4, no. Reno, NV, USA, Nov. 18, 2019-Nov. 22, 2019, Nov. 8, 2019 (Nov. 8, 2019), XP051819416, pp. 1-7, Sections 2, 5 and 6.

VIVO: "Discussion on Potential Positioning Enhancements", 3GPP TSG RAN WG1 #102-e, R1-2005381, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051917406, 20 Pages, Paragraph "6 Consideration for NLOS scenario", Section 5, The whole document, pp. 12-13.

Intel Corporation: "Further Discussion on NR PRS RSTD Requirements", 3GPP TSG-RAN WG4 Meeting # 95-e, R4-2006556, Electronic Meeting, May 25, Jun. 5, 2020, May 15, 2020, May 16, 2020, 20 Pages.

* cited by examiner 10 ms
Radio Frame t-1
Radio Frame t-1
Radio Frame T+1
1 ms
Subframe 0
Subframe 1
Subframe 2
Subframe 3
Subframe 4
Subframe 5
Subframe 6
Subframe 7
Subframe 8
Subframe 9
Slot 0
Slot 1
Slot 2
Slot 3
Symbols
0 1 2 3 4 5 6 7 8 9 10 11 12 13
SS Block
Resource Block (RB)
Carrier
Subcarrier
Symbol
Resource Element (RE)

1310
Receive, from a network entity, a configuration for measuring the PRS measurements 1320
Determine a measurement period 1330
Tune RF circuitry of the UE from an active BWP to one or more frequency bands of at least two PFLs of the plurality of PFLs 1340
Receive a plurality of PRS resources of the at least two PFLs from one or more network nodes 1345
Subsequent to receiving the plurality of PRS resources, re-tuning the RF circuitry of the UE to the active BWP 1350
Determine PRS measurements based on the plurality of PRS resources of the at least two PFLs of the plurality of PFLs and the determined measurement period

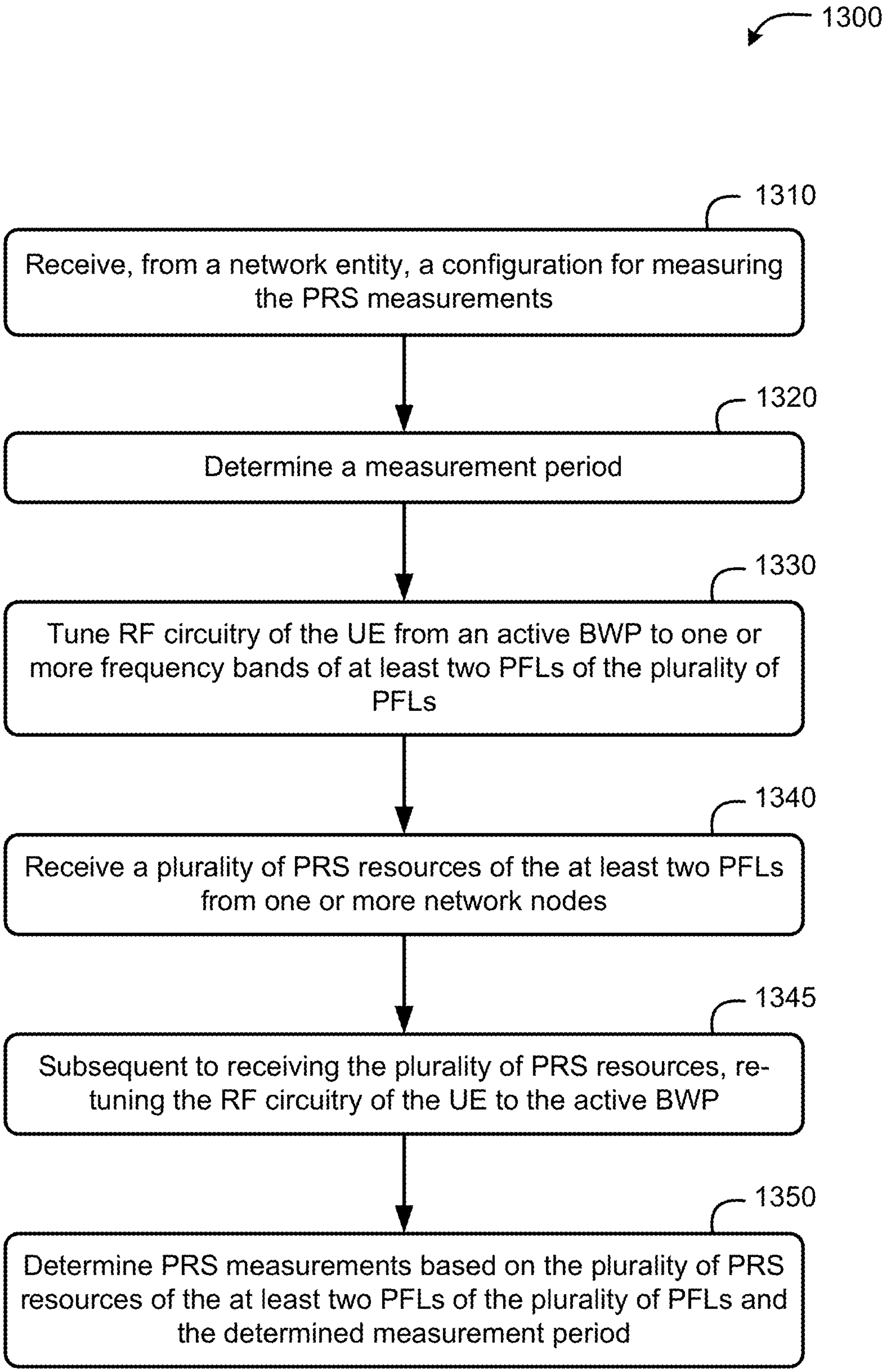

FIG. 13

SIMULTANEOUS PROCESSING OF MULTIPLE POSITIONING FREQUENCY LAYERS IN NR BY A UE

RELATED APPLICATIONS

This application is a U.S. National Phase application of International patent application no. PCT/US21/49046, filed Sep. 3, 2021, entitled "SIMULTANEOUS PROCESSING OF MULTIPLE POSITIONING FREQUENCY LAYERS IN NR BY A UE", which claims the benefit of Greek patent application no. 20200100601, filed Oct. 2, 2020, entitled "Simultaneous Processing of Multiple Positioning Frequency Layers in NR by a UE," both of which are assigned to the assignee hereof and incorporated by reference herein in their entirety.

BACKGROUND

1. Field of Invention

The present invention relates generally to the field of wireless communications, and more specifically to determining the location of a User Equipment (UE) using radio frequency (RF) signals.

2. Description of Related Art

In a Fifth Generation (5G) New Radio (NR) mobile communication network, a network node (e.g., base station or reference UE) may transmit a Positioning Reference Signal (PRS) that can be measured at a UE to determine the location of the UE using any of a variety of network-based positioning methods. An increase in a number of signals measured by the UE can result in an increase in accuracy. The capabilities of the UE, however, can limit an amount of signals the UE is capable of measuring at any given time.

BRIEF SUMMARY

A measurement period in which a User Equipment (UE) can be configured to take Positioning Reference Signal (PRS) measurements may include receiving PRS resources of a plurality of Positioning Frequency Layers (PFLs). To do so, the UE may tune (RF) circuitry of the UE from an active Bandwidth Part (BWP) to a frequency band of the at least one PFL, receive a plurality of PRS resources of a plurality of PFLs from one or more network nodes, and subsequent to receiving the plurality of PRS resources, re-tune the RF circuitry of the UE to the active BWP. The UE can then determine PRS measurements based on the plurality of PRS resources.

An example method at a User Equipment (UE) of measuring Positioning Reference Signal (PRS) measurements using a plurality of Positioning Frequency Layer (PFLs), according to this disclosure, may comprise receiving, from a network entity, a configuration for measuring the PRS measurements. The method also may comprise determining a measurement period. The method also may comprise tuning radio frequency (RF) circuitry of the UE from an active Bandwidth Part (BWP) to one or more frequency bands of at least two PFLs of the plurality of PFLs. The method also may comprise receiving a plurality of PRS resources of the at least two PFLs from one or more network nodes. The method also may comprise subsequent to receiving the plurality of PRS resources, re-tuning the RF circuitry of the UE to the active BWP. The method also may comprise determining PRS measurements based at least in part on the plurality of PRS resources of the at least two PFLs and the determined measurement period.

An example UE for measuring Positioning Reference Signal (PRS) measurements using a plurality of Positioning Frequency Layer (PFLs), according to this disclosure, may comprise a transceiver, a memory, one or more processors communicatively coupled with the transceiver and the memory, wherein the one or more processors are configured to receive, via the transceiver from a network entity, a configuration for measuring the PRS measurements. The one or more processors further may be configured to determine a measurement period. The one or more processors further may be configured to tuning radio frequency (RF) circuitry of the transceiver from an active Bandwidth Part (BWP) to one or more frequency bands of at least two PFLs of the plurality of PFLs. The one or more processors further may be configured to receive a plurality of PRS resources of the at least two PFLs from one or more network nodes. The one or more processors further may be configured to subsequent to receiving the plurality of PRS resources, re-tuning the RF circuitry of the transceiver to the active BWP. The one or more processors further may be configured to determine PRS measurements based at least in part on the plurality of PRS resources of the at least two PFLs and the determined measurement period.

An example apparatus for measuring Positioning Reference Signal (PRS) measurements at a User Equipment (UE) using a plurality of Positioning Frequency Layer (PFLs), according to this disclosure, may comprise means for receiving, from a network entity, a configuration for measuring the PRS measurements. The apparatus further may comprise means for determining a measurement period. The apparatus further may comprise means for tuning radio frequency (RF) circuitry of the UE from an active Bandwidth Part (BWP) to one or more frequency bands of at least two PFLs of the plurality of PFLs. The apparatus further may comprise means for receiving a plurality of PRS resources of the at least two PFLs from one or more network nodes. The apparatus further may comprise means for re-tuning the RF circuitry of the UE to the active BWP subsequent to receiving the plurality of PRS resources. The apparatus further may comprise means for determining PRS measurements based at least in part on the plurality of PRS resources of the at least two PFLs and the determined measurement period.

According to this disclosure, an example non-transitory computer-readable medium stores instructions for measuring Positioning Reference Signal (PRS) measurements at a User Equipment (UE) using a plurality of Positioning Frequency Layer (PFLs), the instructions comprising code for receiving, from a network entity, a configuration for measuring the PRS measurements. The instructions further may comprise code for determining a measurement period. The instructions further may comprise code for tuning radio frequency (RF) circuitry of the UE from an active Bandwidth Part (BWP) to one or more frequency bands of at least two PFLs of the plurality of PFLs. The instructions further may comprise code for receiving a plurality of PRS resources of the at least two PFLs from one or more network nodes. The instructions further may comprise code for subsequent to receiving the plurality of PRS resources, re-tuning the RF circuitry of the UE to the active BWP. The instructions further may comprise code for determining PRS measurements based at least in part on the plurality of PRS resources of the at least two PFLs and the determined measurement period.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 13 is a flow diagram of a method of measuring PRS measurements using a plurality of PFLs, according to an embodiment.

Figure 1:
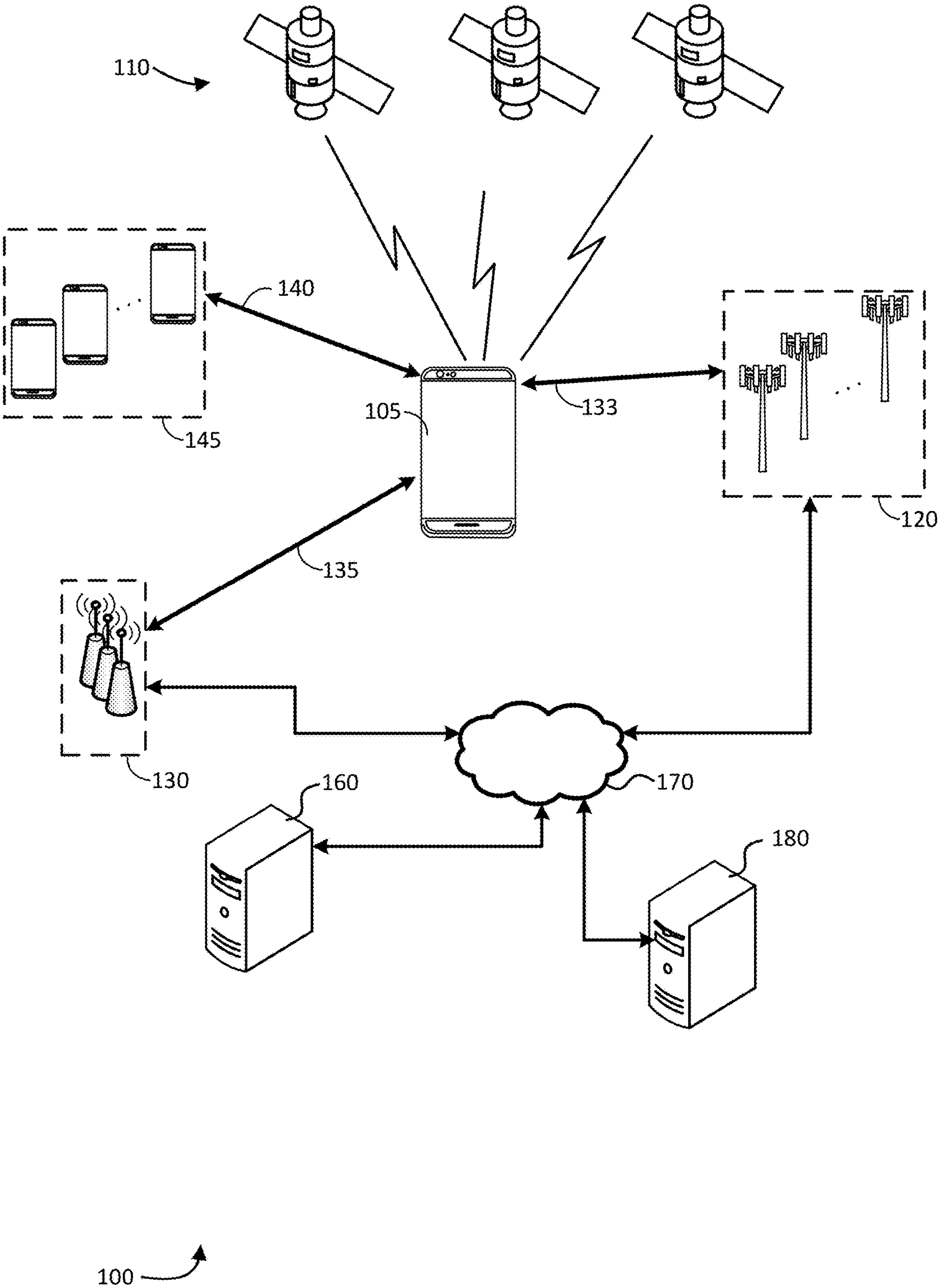
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While some embodiments in which one or more aspects of the disclosure may be implemented as described below, other embodiments may be used, and various modifications may be made without departing from the scope of the disclosure.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 is a simplified illustration of a positioning system 100 in which a UE 105, location server 160, and/or other components of the positioning system 100 can use the techniques provided herein for determining and estimated location of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, 5G NR wireless network, a Wi-Fi WLAN, and the Internet. LTE, 5G and NR are wireless technologies defined, or being defined, by the 3rd Generation Partnership Project (3GPP). (As used herein, the terms "5G NR,", "5G," and "NR" are used interchangeably to refer to these wireless technologies.) Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5G CN) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate the location determination. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between UEs in this manner may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Figure 2:
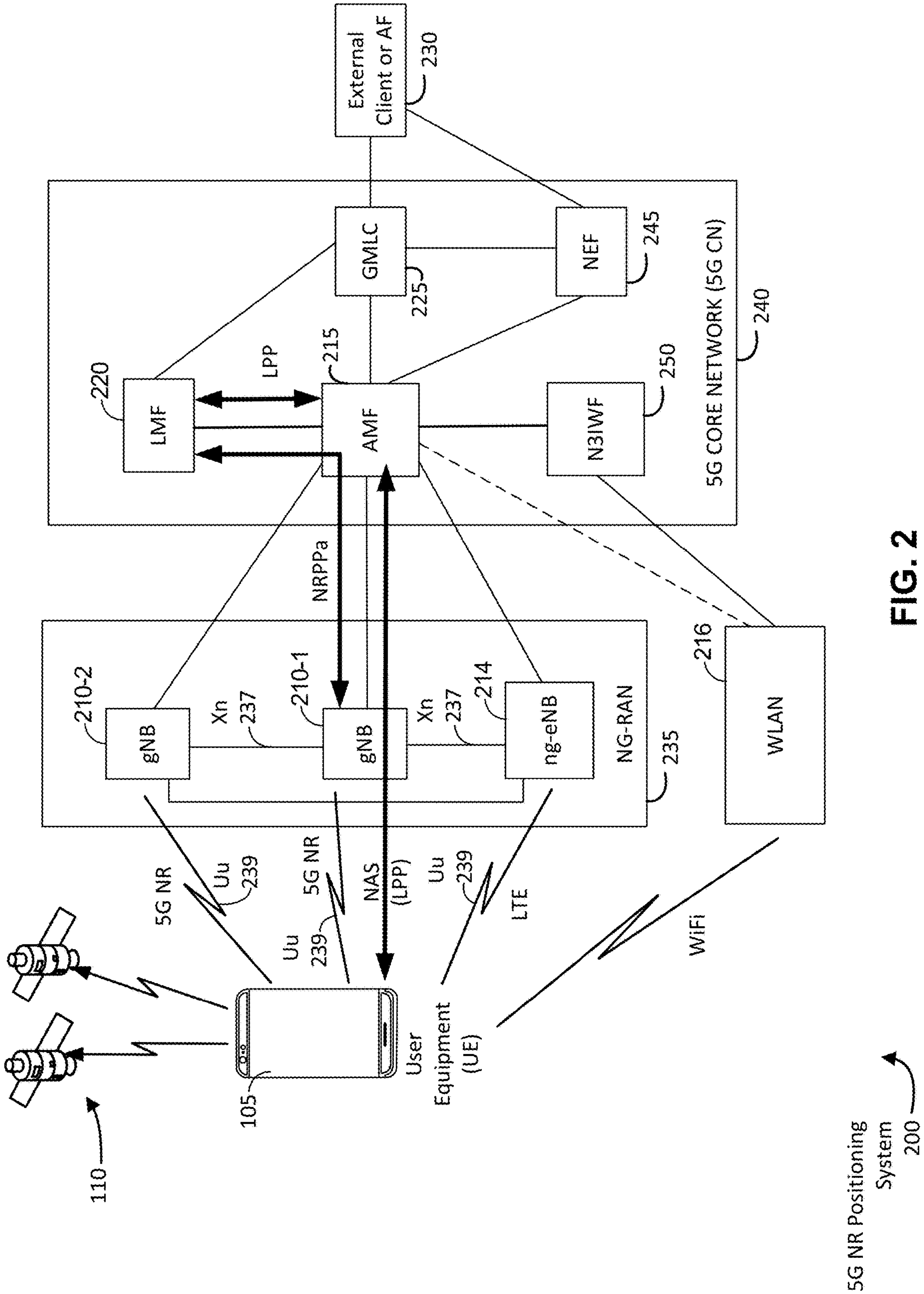
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G CN 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to SGCN 240 may occur if WLAN 216 is a trusted WLAN for SGCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to SGCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as SGCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in SGCN 240. The NEF 245 may support secure exposure of capabilities and events concerning SGCN 240 and UE 105 to the external client 230, which may then be referred to as an Access Function (AF) and may enable secure provision of information from external client 230 to SGCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
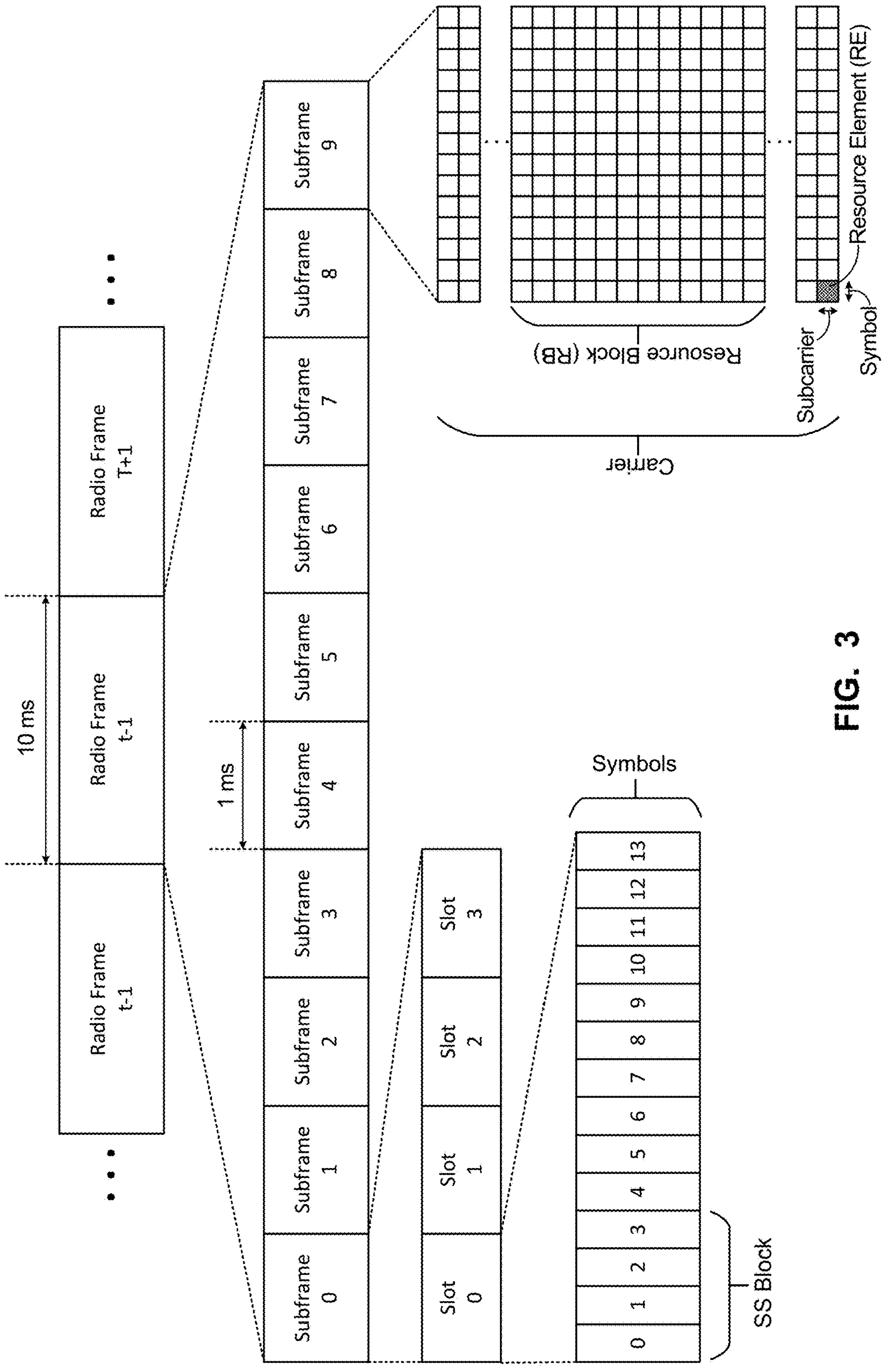
FIG. 3 is a diagram showing an example frame structure for NR, which may be used in some embodiments.

FIG. 3 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 3 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 sub carriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 3. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 4:
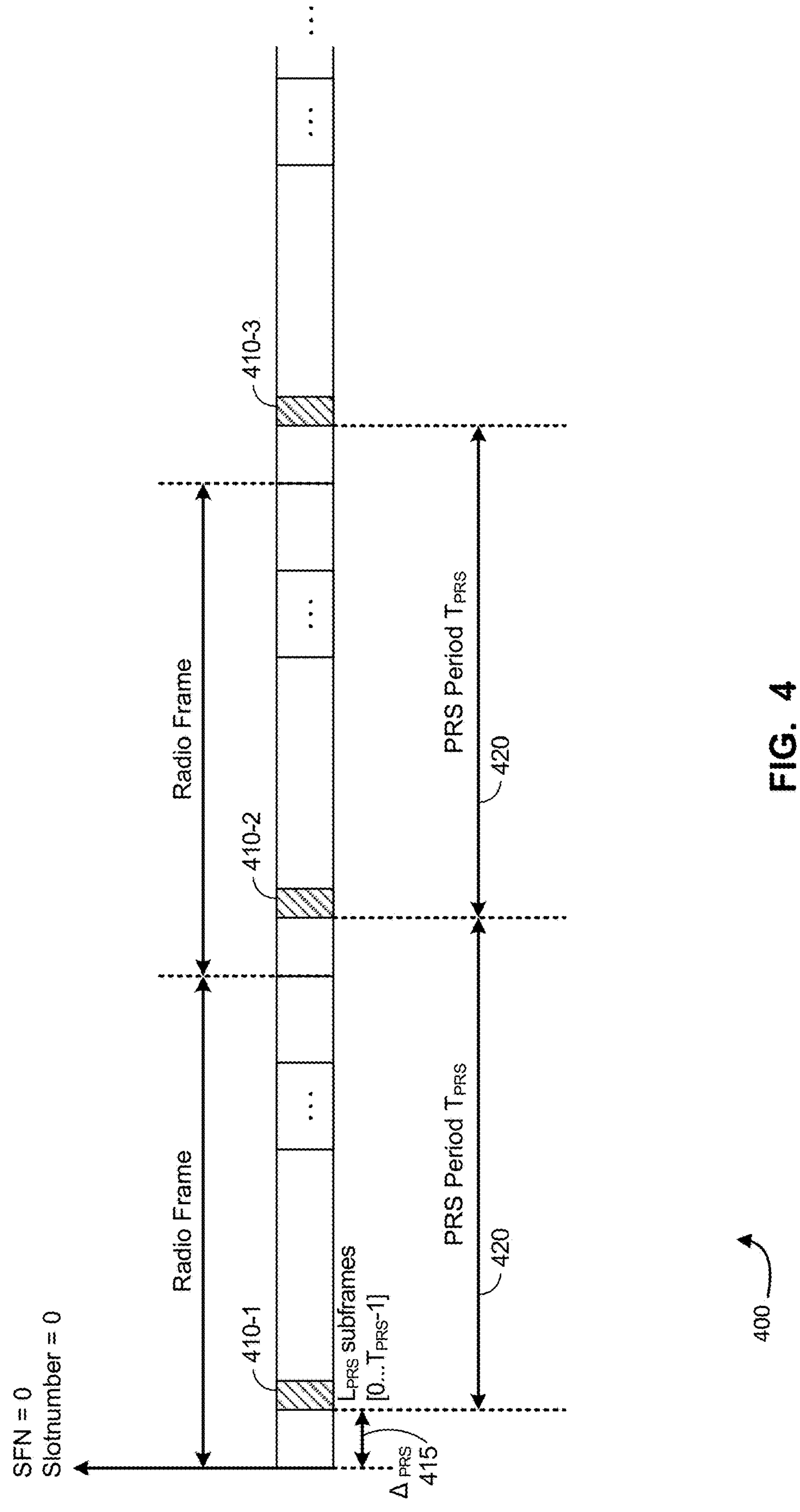
FIG. 4 is a diagram showing an example of a radio frame sequence with Positioning Reference Signal (PRS) positioning occasions.

FIG. 4 is a diagram showing an example of a radio frame sequence 400 with PRS positioning occasions. A "PRS instance" or "PRS occasion" is one instance of a periodically repeated time window (e.g., a group of one or more consecutive slots) where PRS resources (explained in more detail below) are expected to be transmitted. A PRS occasion may also be referred to as a "PRS positioning occasion," a "PRS positioning instance, a "positioning occasion," "a positioning instance," or simply an "occasion" or "instance." Subframe sequence 400 may be applicable to broadcast of PRS signals (DL-PRS signals) from base stations 120 in positioning system 100. The radio frame sequence 400 may be used in 5G NR (e.g., in 5G NR positioning system 200) and/or in LTE. Similar to FIG. 3, time is represented horizontally (e.g., on an X axis) in FIG. 4, with time increasing from left to right. Frequency is represented vertically (e.g., on a Y axis) with frequency increasing (or decreasing) from bottom to top.

FIG. 4 shows how PRS positioning occasions 410-1, 410-2, and 410-3 (collectively and generically referred to herein as positioning occasions 410) are determined by a System Frame Number (SFN), a cell-specific subframe offset ($\Delta_{PRS}$) 415, a length or span of $L_{PRS}$ subframes, and the PRS Periodicity ($T_{PRS}$) 420. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 415 may be defined in terms of the number of subframes transmitted starting from System Frame Number (SFN) 0 to the start of the first (subsequent) PRS positioning occasion.

A PRS may be transmitted by wireless nodes (e.g., base stations 120 or other UEs) after appropriate configuration (e.g., by an Operations and Maintenance (O&M) server). A PRS may be transmitted in special positioning subframes or slots that are grouped into positioning occasions 410. For example, a PRS positioning occasion 410-1 can comprise a number $N_{PRS}$ of consecutive positioning subframes where the number $N_{PRS}$ may be between 1 and 160 (e.g., may include the values 1, 2, 4 and 6 as well as other values). PRS positioning occasions 410 may be grouped into one or more PRS occasion groups. As noted, PRS positioning occasions 410 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some embodiments, $T_{PRS}$ may be measured in terms of the number of subframes between the start of consecutive positioning occasions.

In some embodiments, when a UE 105 receives a PRS configuration index $I_{PRS}$ in the assistance data for a particular cell (e.g., base station), the UE 105 may determine the PRS periodicity $T_{PRS}$ 420 and cell-specific subframe offset ($\Delta_{PRS}$) 415 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 415) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS positioning occasions 410 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

Figure 5:
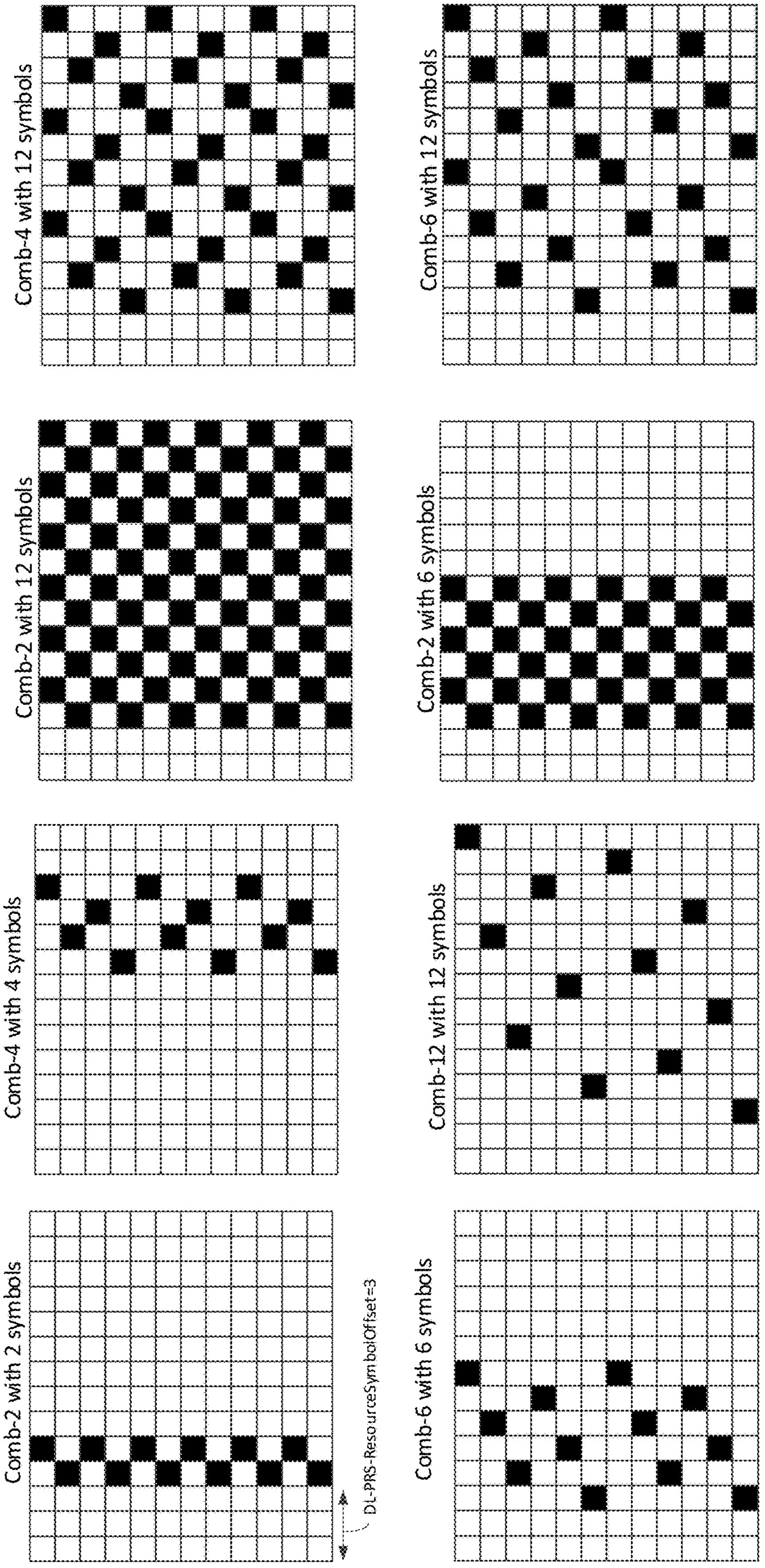
FIG. 5 is a diagram of a hierarchical structure of how PRS resources and PRS resource sets may be used by different Transmission Reception Points (TRPs) of a given Positioning Frequency Layer (PFL), as defined in 5G NR.

With reference to the frame structure in FIG. 3, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular combination, or "comb," size. (Comb size also may be referred to as the "comb density.") A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 5.

A "PRS resource set" comprises a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). A "PRS resource repetition" is a repetition of a PRS resource during a PRS occasion/instance. The number of repetitions of a PRS resource may be defined by a "repetition factor" for the PRS resource. In addition, the PRS resources in a PRS resource set may have the same periodicity, a common muting pattern configuration, and the same repetition factor across slots. The periodicity may have a length selected from $2^{m}\cdot\{4, 5, 8, 10, 16, 20, 32, 40, 64, 80, 160, 320, 640, 1280, 2560, 5120, 10240\}$ slots, with $\mu$=0, 1, 2, 3. The repetition factor may have a length selected from {1, 2, 4, 6, 8, 16, 32} slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (e.g., 210, 214, 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 6:
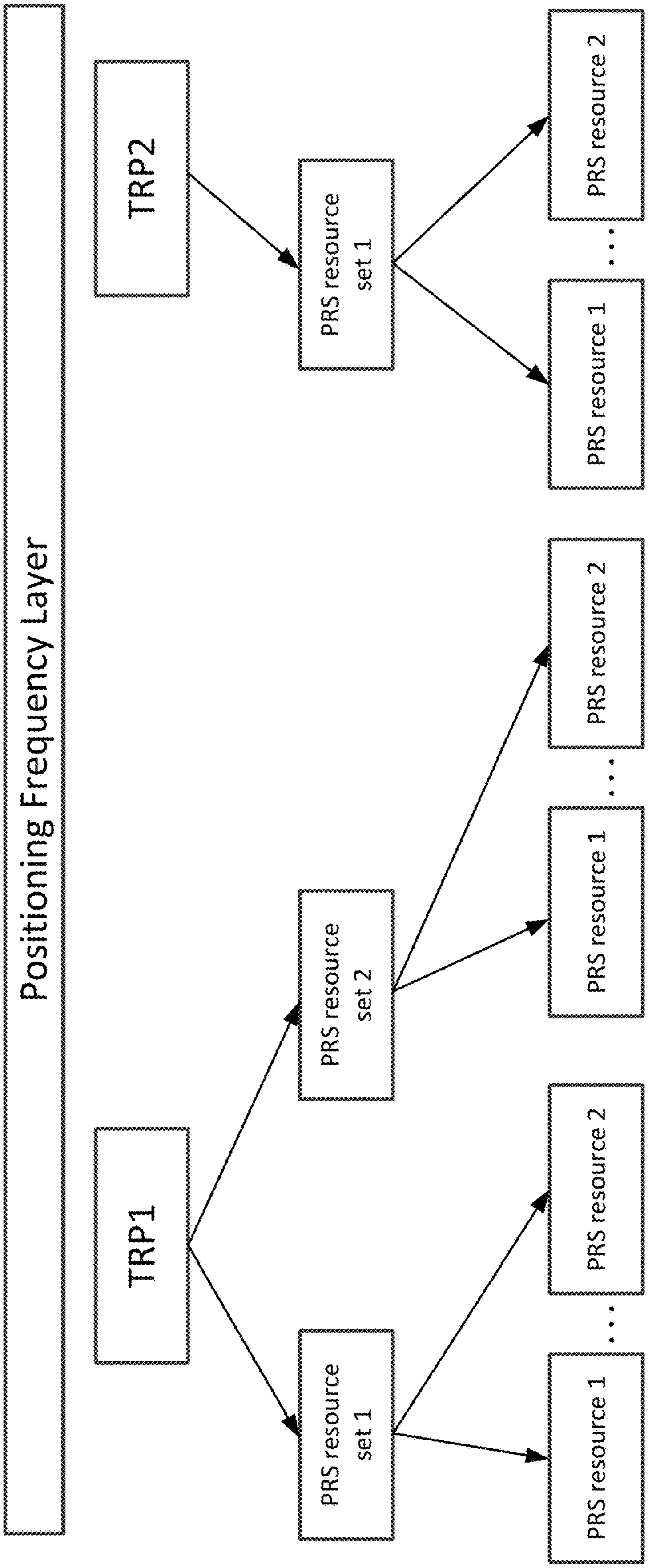
FIG. 6 is a simplified diagram illustrating how an anchor UE can be used in the positioning of a target UE in a 5G NR network, according to an embodiment.

FIG. 6 is a diagram of a hierarchical structure of how PRS resources and PRS resource sets may be used by different TRPs of a given position frequency layer (PFL), as defined in 5G NR. With respect to a network (Uu) interface, a UE 105 can be configured with one or more DL-PRS resource sets from each of one or more TRPs. Each DL-PRS resource set includes K≥1 DL-PRS resource(s), which, as previously noted, may correspond to a Tx beam of the TRP. A DL-PRS PFL is defined as a collection of DL-PRS resource sets which have the same subcarrier spacing (SCS) and cyclic prefix (CP) type, the same value of DL-PRS bandwidth, the same center frequency, and the same value of comb size. In current iterations of the NR standard, a UE 105 can be configured with up to four DL-PRS PFLs.

NR has multiple frequency bands across different frequency ranges (e.g., Frequency Range 1 (FR1) and Frequency Range 2 (FR2)). PFLs may be on the same band or different bands. In some embodiments, they may even be in different frequency ranges. Additionally, as illustrated in FIG. 6, multiple TRPs (e.g., TRP1 and TR2) may be on the same PFL. Currently under NR, each TRP can have up to two PRS resource sets, each with one or more PRS resources, as previously described.

Different PRS resource sets may have different periodicity. For example, one PRS resource set may be used for tracking, and another PRS resource that could be used for acquisition. Additionally or alternatively, one PRS resource set may have more beams, and another may have fewer beams. Accordingly, different resource sets may be used by a wireless network for different purposes. Example repetition and beam sweeping options for resource sets are illustrated in FIG. 7.

Figure 7:
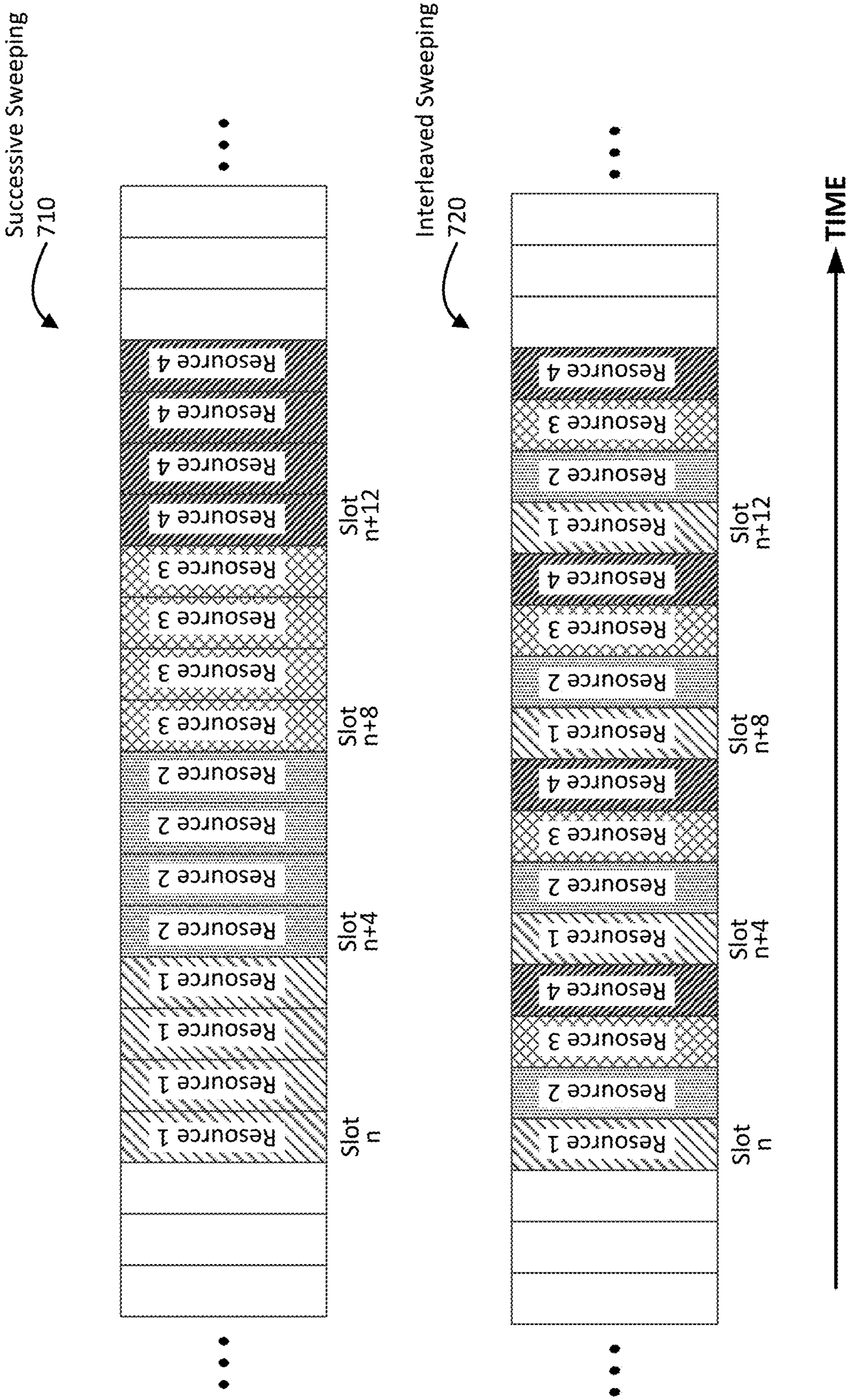
FIG. 7 is a time diagram illustrating two different options for slot usage of a resource set, according to an embodiment.

FIG. 7 is a time diagram illustrating two different options for slot usage of a resource set, according to an embodiment. Because each example repeats each resource four times, the resource set is said to have a repetition factor of four. Successive sweeping 710 comprises repeating a single resource (resource 1, resource 2, etc.) four times before proceeding to a subsequent resource. In this example, if each resource corresponds to a different beam of a TRP, the TRP repeats a beam for four slots in a row before moving to the next beam. Because each resource is repeated in successive slots (e.g., resource 1 is repeated in slots n, n+1, n+2, etc.), the time gap is said to be one slot. On the other hand, for interleaved sweeping 720, the TRP may move from one beam to the next for each subsequent slot, rotating through four beams for four rounds. Because each resource is repeated every four slots (e.g., resource 1 is repeated in slots n, n+4, n+8, etc.), the time gap is said to be one slot. Of course, embodiments are not so limited. Resource sets may comprise a different amount of resources and/or repetitions. Moreover, as noted above, each TRP may have multiple resource sets, multiple TRPs may utilize a single PFL, and a UE may be capable of taking measurements of PRS resources transmitted via multiple PFLs.

Thus, to obtain PRS measurements from PRS signals sent by TRPs and/or UEs in a network, the UE can be configured to observe PRS resources during a period of time called a measurement period. That is, to determine a position of the UE using PRS signals, a UE and a location server (e.g., LMF 220 of FIG. 2) may initiate a location session in which the UE is given a period of time to observe PRS resources and report resulting PRS measurements to the location server. As described in more detail below, this measurement period may be determined based on the capabilities of the UE.

To measure and process PRS resources during the measurement period, a UE can be configured to execute a measurement gap (MG) pattern. The UE can request a measurement gap from a serving TRP, for example, which can then provide the UE with the configuration (e.g., via Radio Resource Control (RRC) protocol). For discussion purposes, a generic illustration of an MG pattern is provided in FIG. 8.

As noted, a UE may be configured to execute an MG pattern to measure and process PRS resources of a PRS resource set outside an active DL bandwidth part (BWP) via which the UE sends and receives data with a serving TRP. To allow the network to configure the UE in a manner that accommodates the processing and buffering capabilities of the UE (which may be dynamic), the UE may provide to the network (e.g., a TRP or location server) capabilities related to PRS processing. The various parameters of the MG pattern can be configured in view of these capabilities.

Figure 8:
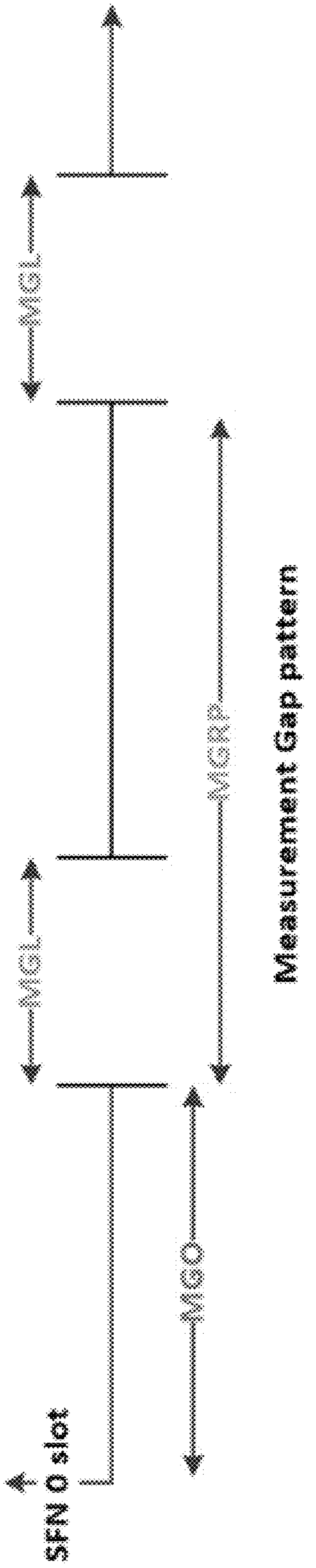
FIG. 8 is a generic illustration of a Measurement Gap (MG) pattern.

As illustrated in FIG. 8, the various parameters of a MG pattern comprise an MG offset (MGO), MG length (MGL), and MG repetition period (MGRP). The MGL is a time period in which the UE can tune from an active BWP (e.g., DL BWP) to a band having one or more PFLs in which PRS resources are transmitted. Thus, the MGL (which may be 6 ms, for example) is a periodic opportunity for the UE to receive PRS resources to make a PRS measurement.

Capabilities of the UE can include a combination of N and T values per band. Here, N is a duration of PRS symbols in ms processed every T ms for a given maximum bandwidth (B) in MHz supported by the UE. As an example, if T=8 and N=4, this means the UE can process 4 ms of PRS symbols every 8 ms. Values for N may be {0.125, 0.25, 0.5, 1, 2, 4, 8, 12, 16, 20, 25, 30, 35, 40, 45, 50} ms. Values for T may be {8, 16, 20, 30, 40, 80, 160, 320, 640, 1280} ms. Values for B reported by the UE may be {5, 10, 20, 40, 50, 80, 100, 200, 400} MHz. The UE's capability for the number of PRS resources that the UE can process in a slot, N' (which is reported per SCS per band) may be {1, 2, 4, 8, 12, 16, 32, 64}.

These capabilities may be taken into account when determining a measurement period for the UE, where the measurement period is the total time allotted to a UE to report a PRS measurement. The basic scaling factor for measurement period should depend on UE capabilities N and N'. Where (as previously noted) $L_{PRS}$ represents the span of a PRS occasion 410 comprised of all PRS resources defined as the time from the first slot of the earliest PRS resource to the last slot of latest PRS resource, $L_{PRS}$ may be different than (e.g., shorter than) the length of the gap (MGL) itself. Given this understanding, if $L_{PRS} \leq N$, then the UE may only need T ms to process the PRS resources. Otherwise, the measurement period can be scaled across multiple occasions to allow the UE to measure PRS resources in round-robin fashion. Similarly, if the number of PRS resources in a slot, $$N_{PRS}^{slot},$$

is equal to or smaller than N', then the UE may only need T ms to process the PRS resources. Otherwise, the measurement period can be scaled similarly as in N case. This scaling factor for the measurement period can therefore be expressed as:

$$\max\left(\left\lceil \frac{L_{PRS}}{N} \right\rceil, \left\lceil \frac{N_{PRS}^{slot}}{N'} \right\rceil\right). \quad (1)$$

Given the measurement period scaling factor (1), the measurement period of an i-th PFL, $T_{RSTD,i}$, can be calculated as:

$$T_{RSTD,i} = N_{Rx,beam} \cdot N_{sample} \cdot CSSF \cdot \left\{\max\left(\left\lceil \frac{L_{PRS}}{N} \right\rceil, \left\lceil \frac{N_{PRS}^{slot}}{N'} \right\rceil\right) \cdot \left\lceil \frac{T}{MGRP_e} \right\rceil \cdot MGRP_e + T\right\}, \quad (2)$$

where $N_{Rx,beam}$ is a UE Rx beam sweeping factor (i.e., a number of beams sampled before the measurement is obtained), $N_{sample}$ is the basic number of PRS occasions needed to meet the accuracy requirements, CSSF is the Carrier-Specific Scaling Factor for measurement with gap sharing with other radio resource management (RRM) measurements (e.g., a 50% utilization of the MG for PRS measurements would result in a CSSF value of 2). The term $$\left\lceil \frac{T}{MGRP_e} \right\rceil \cdot MGRP_e$$

accounts for time division multiplexing signals based on the limits of UE capabilities, and T is provided as an additional buffer. Because UEs traditionally processed different PFLs sequentially, the determination of a total measurement period for a UE to obtain PRS measurements across multiple PFLs would be the summation of (2) for all PFLs:

$$T_{RSTD,total}=\Sigma_i T_{RSTD,i}. \tag{3}$$

Figure 9:
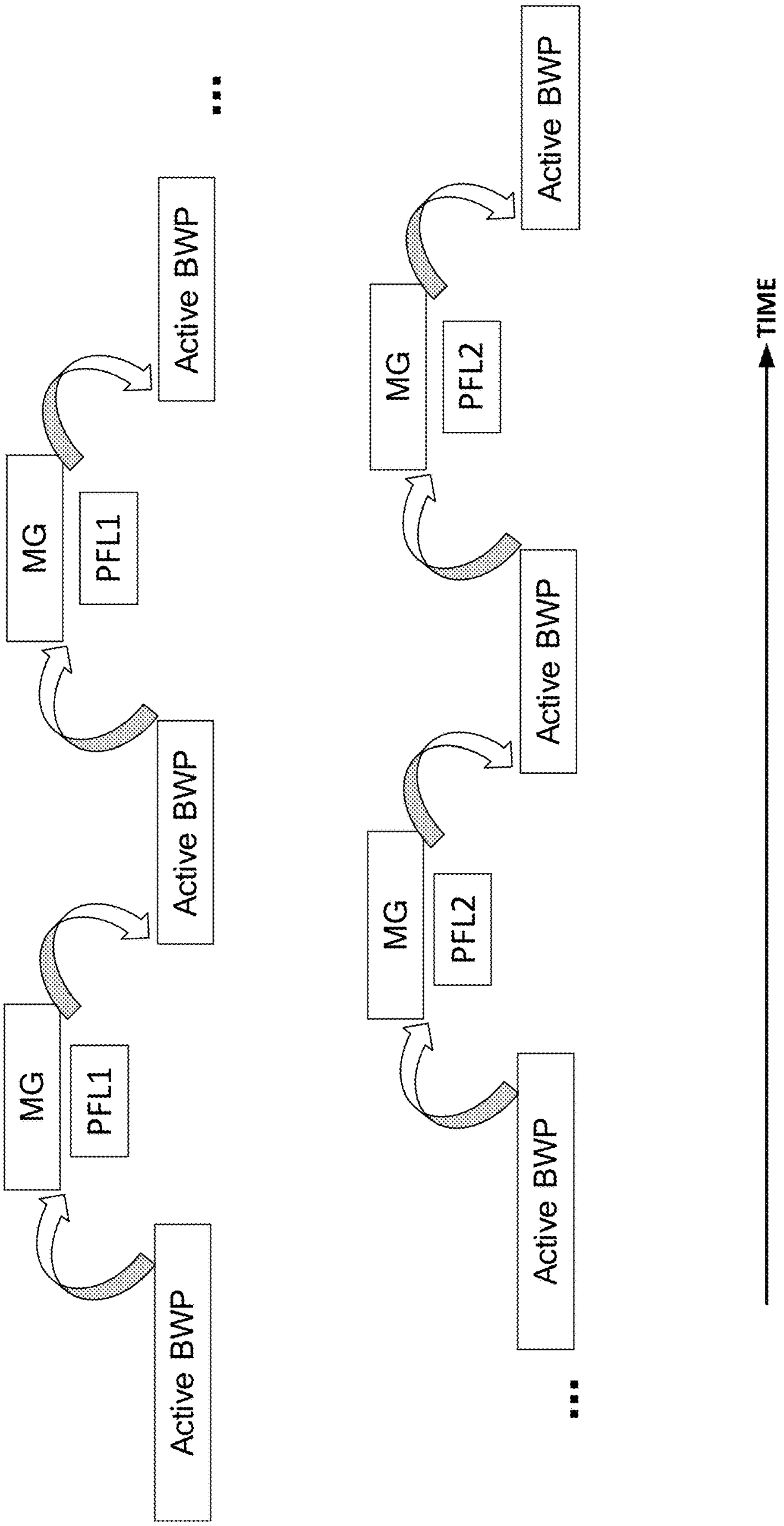
FIG. 9 is a timeline diagram of a measurement period having multiple MGs.

FIG. 9 is a timeline diagram that provides a visualization for equation (3). As with other figures herein, the passage of time is illustrated from left to right. Here, the functionality of the UE is illustrated as tuning RF circuitry (e.g., a transceiver) from an active BWP to one or more different bands during a series of MGs to take measurements of different PFLs. The timeline begins in the upper left-hand portion, where the UE tunes from an active BWP to a separate band during an MG to receive PRS resources in a first PFL (PFL1). In accordance with equation (2), this may need to be repeated across several MGs to meet accuracy requirements for measurements in the first PFL. As shown by the ellipses, the timeline at the top of the illustration in FIG. 9 continues below, where the UE then tunes to a second PFL (PFL2) during measuring gaps. Thus, total measurement time for all frequency layers is a summation of the measurement time of each frequency layer.

According to embodiments herein, a UE may leverage current UE capabilities to tune to multiple PFLs during an MG, resulting in a more efficient total measurement period. This can be achieved using time division multiplexed (TDMed) and/or frequency division multiplexed (FDMed) configurations, as illustrated in FIGS. 10 and 11.

Figure 10:
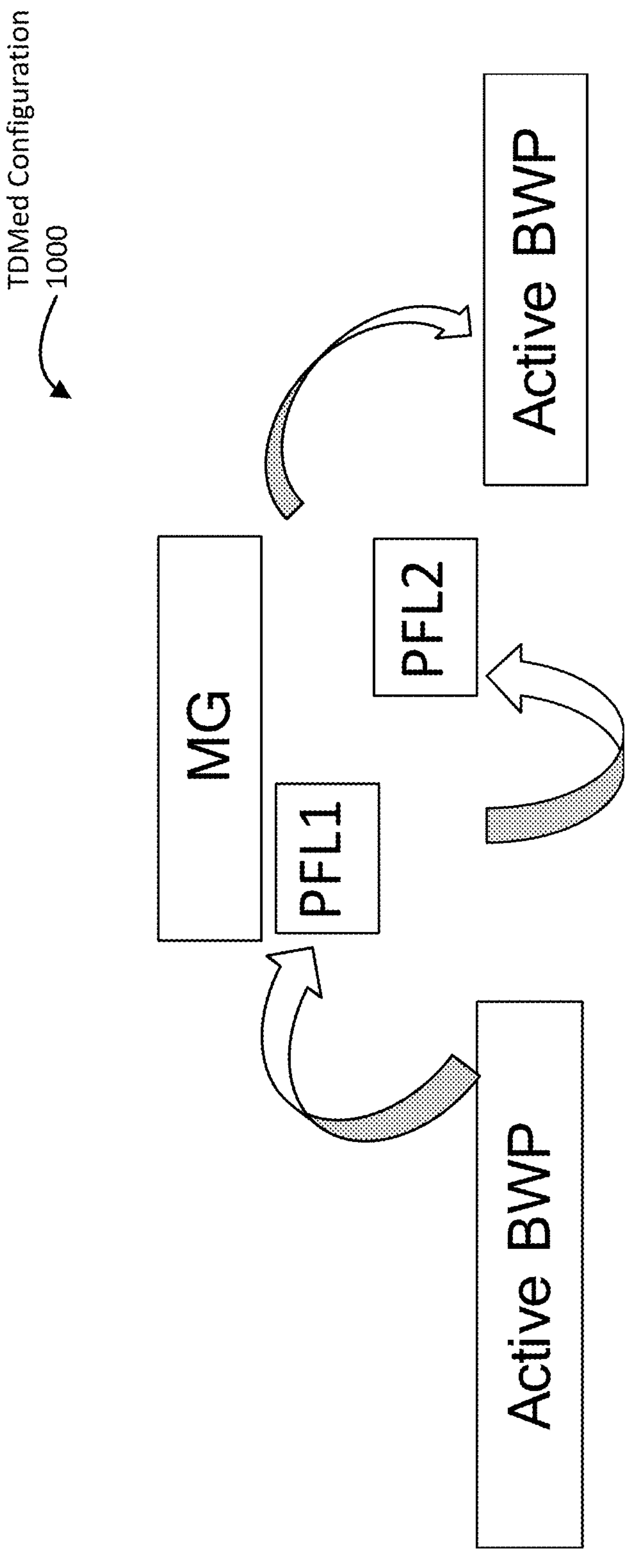
FIGS. 10-12 are timeline diagrams showing examples of how multiple PFL may be processed in the same MG, according to some embodiments.

FIG. 10 is a timeline diagram, similar to FIG. 9, illustrating a TDMed configuration 1000 for frequency layer processing. Here, a UE tunes from an active BWP to a different band to receive PRS resources of a first PFL (PFL1) during a measurement gap. Before the measurement gap ends, however, the UE further receives PRS resources of a second PFL (PFL2) prior to re-tuning to the active BWP. As illustrated by the arrow in FIG. 10 between PFL1 and PFL2, the UE may tune from a first band to a second band to be able to receive PRS resources from the first and second PFLs. That said, this may not always be the case. In some instances, the first and second PFLs may be in the same band. In such cases, retuning during the MG therefore may not be needed.

Figure 11:
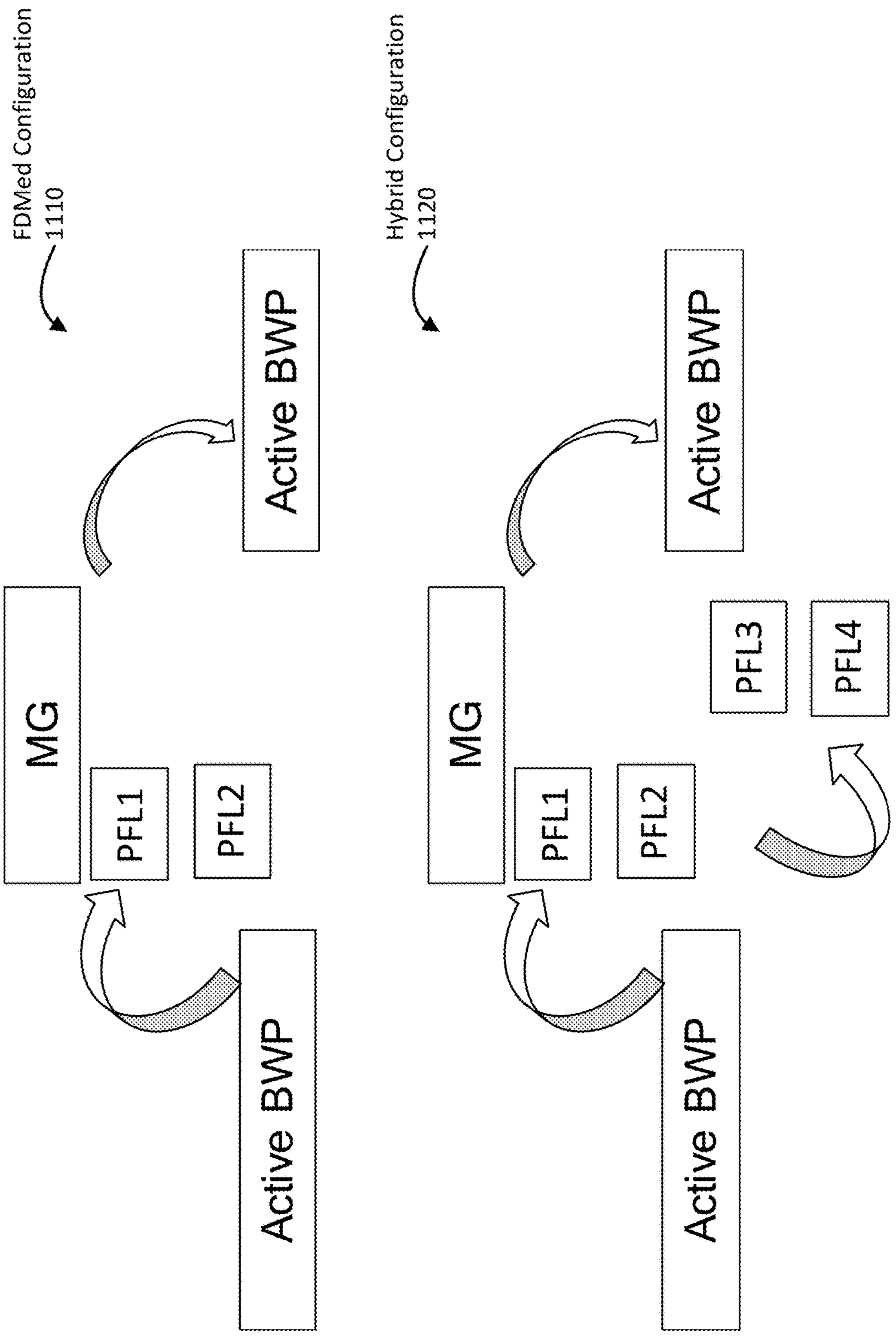

FIG. 11 is another timeline diagram, similar to FIG. 10, but with alternative configurations. The FDMed configuration 1110 illustrates a configuration in which a UE is capable of simultaneously processing PRS resources in both first and second PFLs. In such cases, both PFL's may be in the same band, and may partially or fully overlap, using some or all of the same symbols.

The hybrid configuration 1120 represents a combination of the FDMed configuration 1110 and TDMed configuration 1000. That is, a UE is capable of taking measurements of sets of PFLs: taking a first set of measurements from a first set of PFLs (PFL1 and PFL2), then taking a second set of measurements from a second set of PFLs (PFL3 and PFL4). Measurements within each set are taken similar to the FDMed configuration 1110, and the combination of both sets are similar to the TDMed configuration 1000. As such, the UE may re-tune RF circuitry between the first and second sets of PFLs from a first band to a second band.

To be able to process multiple PFLs in a single series of MGs, the UE may have certain capabilities. For example, with regard to RF functionality, a UE may have antennas and RF front ends capable of receiving PRS signals in multiple frequency layers (e.g., 2.5 GHz and 3.5 GHz). With regard to baseband capabilities, a UE may be able to process different PRS signals at the same time. A UE may communicate these capabilities (e.g., the capability of processing X number of PFLs at the same time) to a network node (e.g., a TRP or location server).

The UEs capability of processing PRS resources across multiple PFLs at the same time can alter the total measurement period calculation of equation (3). That is, rather than a summation of measurement periods for all PFLs, the total measurement period becomes the maximum measurement period of the PFLs:

$$T_{RSTD,total}=\max_i(T_{RSTD,i}). \tag{4}$$

Figure 12:
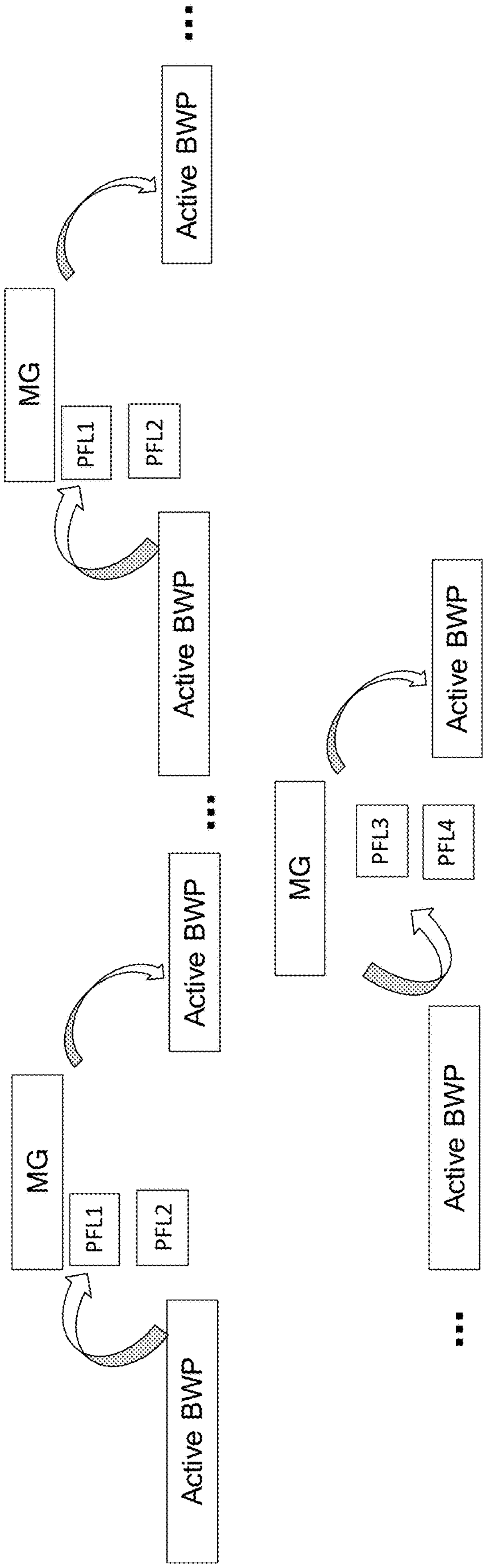

In some instances, embodiments may still process sets of PFLs in sequence, as illustrated in FIG. 12. That is, during a series of MGs, the UE may first receive PRS resources in a first set of PFLs (PFL1 and PFL2), then receive PRS resources in a second set of PFLs (PFL3 and PFL4). Although the receipt of both sets illustrated in FIG. 12 are in accordance with FDMed configuration 1110, embodiments are not so limited. The receipt of either or both sets alternatively may be in accordance with TDMed configuration 1000 and/or hybrid configuration 1120. In such instances, the total measurement period may be determined as the summation of the maximum measurement period of each set of PFLs:

$$T_{RSTD,total}=\max_{i\in S_1}(T_{RSTD,i})+\max_{i\in S_2}(T_{RSTD,i}), \tag{5}$$

where $S_1$ and $S_2$ are sets 1 and 2 respectively. As can be seen, equation (5) can be expanded to cases in which additional sets are used. Can be further noted that equation (5) is backward compatible. That is, if each set includes only one PFL, equation (5) effectively becomes equation (3).

As noted, to properly account for the UEs capability of processing PRS resources in multiple frequency layers at the same time in the determination of a measurement period in the MG configuration of the UE, the UE can provide information indicative of its capabilities to a network node (e.g., location server or TRP). According to some embodiments, this may comprise reporting PFL combinations that can be processed simultaneously (e.g., the UE is capable of processing PFL1 and PFL2 simultaneously and PFL3 and PFL4 simultaneously). It further may be implied that other combinations cannot be processed simultaneously. According to some embodiments, this may comprise reporting all PFL combinations, and whether UE is capable of processing each combination simultaneously or not (e.g., the UE is capable of processing PFL1 and PFL2 simultaneously, not capable of processing PFL1 and PFL4 simultaneously, etc.). The UE may further report whether PFLs and/or sets of PFLs may be processed in accordance with a TDMed configuration 1000, FDMed configuration 1110, and/or hybrid configuration 1120. Additionally or alternatively, a UE may indicate whether it is capable of processing all PFLs of a certain band or frequency range (FR) simultaneously.

Capabilities of a UE may be dynamic and therefore may change from one positioning session to the next. That is, in some instances, a UE may be capable of providing additional resources (e.g., RF resources and/or processing resources) for high-priority/urgent position fixes. In such cases, a UE may report to a network entity that it has more capabilities than in other, lower-priority cases.

According to some embodiments, the length of an MG (the MGL shown in FIG. 8) may be adjusted to accommodate the capabilities of a UE. That is, a UE may be configured with a longer measurement gap to allow for additional, simultaneous processing. On the other hand, UEs with less simultaneous processing capabilities may be configured with relatively shorter MGs.

It can be noted that, although embodiments have described simultaneous processing of PRS resources of TRPs on different PFLs, embodiments are not limited to network interfaces (Uu). That is, in addition or as an alternative to DL PRS resources of TRPs, embodiments may utilize sidelink (SL) PRS resources from other UEs in a similar fashion. For example, a UE may be capable of processing DL PRS resources and SL PRS resources simultaneously in the manner described he previously-described manner. That said, in some embodiments, DL PRS resources and SL PRS resources may be processed separately, in dedicated blocks. Thus, the measurement period for a PFL in Uu may not be affected by whether a positioning PFL in SL is configured. Reports may be entirely separate.

Figure 14:
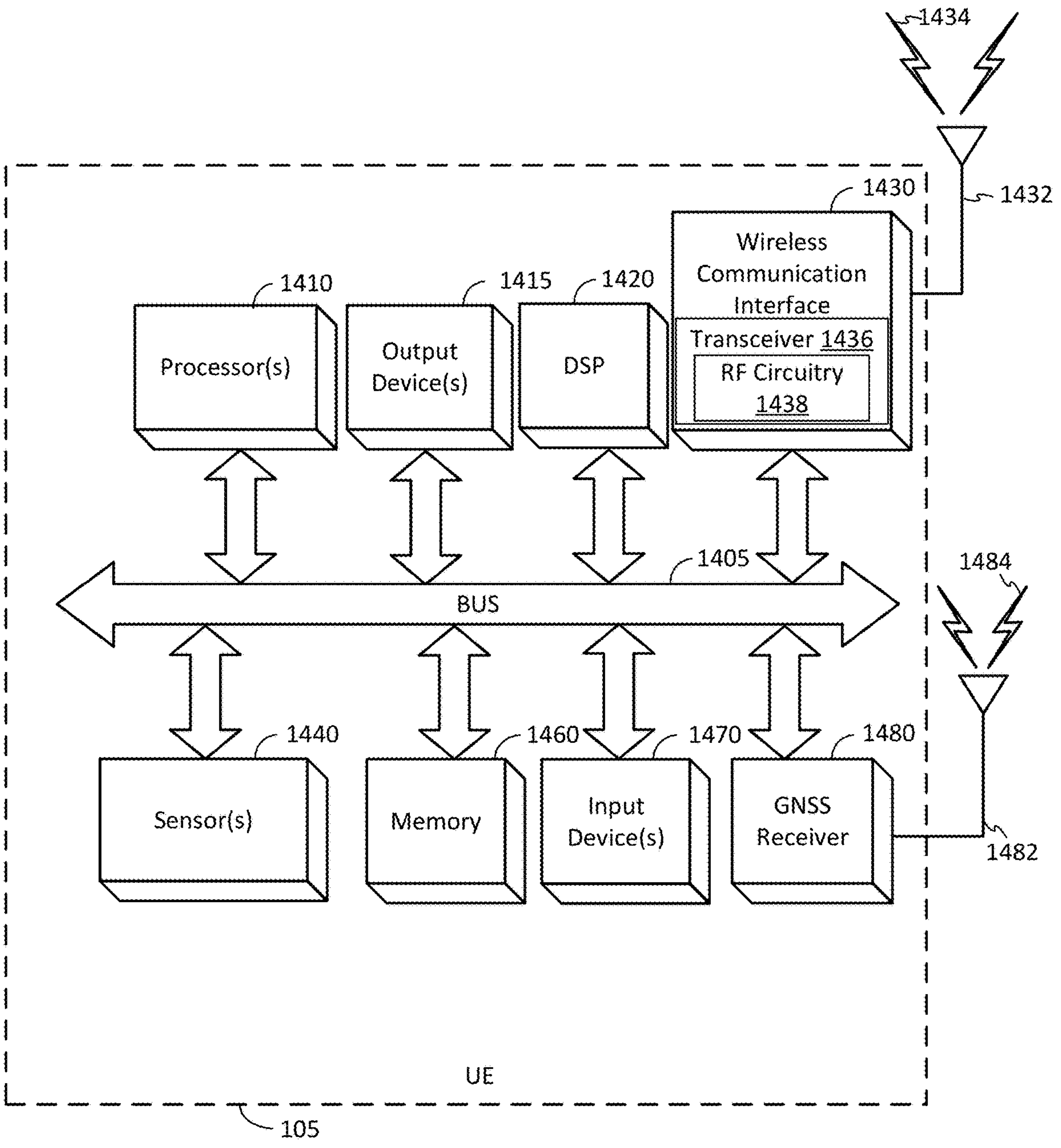
FIG. 14 is a block diagram of a User Equipment (UE), according to an embodiment.

FIG. 13 is a flow diagram 1300 of a method of measuring PRS measurements using a plurality of PFLs, according to an embodiment. Means for measuring the functionality illustrated in the blocks shown in FIG. 13 may be measured by hardware and/or software components of a UE. Example components of a UE are illustrated in FIG. 14, which are described in more detail below.

At block 1310, the functionality comprises receiving, from a network entity, a configuration for measuring the PRS measurements. As previously noted, an MG gap configuration may be provided via RRC protocol from a serving TRP. That said, according to some embodiments, other types of configurations may be made and provided to the UE by a different network entity, such as the location server. Moreover, the configuration may not necessarily be an MG configuration. Here, a configuration may mean, more broadly, a configuration for the UE to take measurements. As noted in more detail below, this may not necessarily mean measurements take place in an MG. As used herein, the term "measurement window" may comprise an MG (e.g., as defined via relevant 3GPP standards) or a similar period of time during which a UE may tune away from an active BWP to take positioning measurements before re-tuning back to the active BWP. Means for performing functionality at block 1310 may comprise a wireless communication interface 1430, bus 1405, digital signal processor (DSP) 1420, processor(s) 1410, memory 1460, and/or other components of a UE 105, as illustrated in 14.

At block 1320, the functionality comprises, determining a measurement period. As noted above, the determination of the measurement period can be made separately by the network and the UE using common rules for calculating the measurement period, which may be included in a communication standard. That said, according to some embodiments, the calculation of the measurement period may be made by one entity and sent to another. Thus, according to some embodiments, the UE may determine a measurement period by receiving a calculation of the measurement period made by a location server (e.g., LMF). Means for performing functionality at block 1320 may comprise a wireless communication interface 1430, bus 1405, DSP 1420, processor(s) 1410, memory 1460, and/or other components of a UE 105, as illustrated in 14.

At block 1330, the functionality comprises tuning RF circuitry of the UE from an active BWP to one or more frequency bands of at least two PFLs of the plurality of PFLs. Further, at block 1340, the functionality comprises receiving a plurality of PRS resources of the at least two PFLs from one or more network nodes. Additionally, at block 340, the functionality comprises, subsequent to receiving the plurality of PRS resources, re-tuning the RF circuitry of the UE to the active BWP. As noted in the above-described embodiments, the operations at blocks 1330, 1340, and 1345 may take place during a measurement window (e.g., MG) for each measurement window in a series of measurement windows in a measurement period used to take PRS measurements (shown, for example, in FIG. 12). Is further noted, the receipt of PRS resources in different PFLs may be done in accordance with a TDMed and/or FDMed configuration. For embodiments utilizing a TDMed configuration (e.g., as shown in FIG. 10), receiving the plurality of PRS resources of the at least two PFLs may comprise receiving a first PRS resource of a first PFL during a first set of Orthogonal Frequency-Division Multiplexing (OFDM) symbols in a measurement window, and receiving a second PRS resource of a second PFL during a second set of OFDM symbols in the measurement window. In some embodiments, the UE may re-tune RF circuitry between the first and second sets of symbols. Thus, in such embodiments, the first PFL maybe on a first frequency band, and subsequent to receiving the first PRS resource and prior to the re-tuning the RF circuitry of the UE to the active BWP, the RF circuitry of the UE is tuned to a second frequency band, where the second PRS resource is received via the second frequency band. For embodiments utilizing an FDMed configuration (e.g., as shown in FIGS. 11 and 12), receiving the plurality of PRS resources of the at least two PFLs may comprise receiving a first PRS resource of a first PFL and a second PRS resource of a second PFL during the same set of OFDM symbols in a single measurement window.

Depending on desired functionality, the one or more network nodes may vary in type and/or number. As noted in the above-described embodiments, the network notes may comprise TRPs and/or UEs. As such, in some embodiments, the one or more network nodes comprises at least one TRP and the plurality of PRS resources comprise at least one DL PRS resource. Additionally or alternatively, the one or more network nodes comprises at least one additional UE and the plurality of PRS resources comprise at least one sidelink (SL) PRS resource.

Means for performing functionality at blocks 1330, 1340, and 1345 may comprise a wireless communication interface 1430, bus 1405, DSP 1420, processor(s) 1410, memory 1460, and/or other components of a UE 105, as illustrated in 14.

At block 1350, the functionality comprises determining PRS measurements based at least in part on the plurality of PRS resources of the at least two PFLs and the determined measurement. As previously indicated, these measurements, which may be indicative of a time at which PRS signals are received, may be used, for example, in OTDOA-based, RTT-based, and/or AOD-based positioning methods. Moreover, the they may be provided by the UE to a location server in a positioning session between the two entities. Means for performing functionality at block 1340 may comprise a wireless communication interface 1430, bus 1405, DSP 1420, processor(s) 1410, memory 1460, and/or other components of a UE 105, as illustrated in 14.

According to some embodiments, a UE additionally may perform operations in view of a positioning session with a location server. For example, according to some embodiments, a UE may further provide, prior to receiving the configuration, capabilities of the UE related to taking the PRS measurements to a location server. Providing the capabilities of the UE comprise providing an indication of an ability of the UE to receive multiple PRS resources from multiple PFLs during a single measurement window, a number of PFLs for which the UE can receive PRS resources during a single measurement window, PFLs that can be received by the UE during a common set of OFDM symbols, PFLs that cannot be received by the UE during a common set of OFDM symbols, or one or more frequency bands in which the UE is capable of receiving PRS resources, or any combination thereof. According to some embodiments, a UE may receive, subsequent to providing the capabilities of the UE, an indication of the measurement period from a location server.

As detailed in the previously described embodiments, the determination of the measurement period (e.g., by the UE and/or location server) may be made in a variety of ways using various considerations. According to some embodiments, the determination may be based on the capabilities of the UE. Furthermore, as indicated in equation (4), the measurement period may be based on a maximum total measurement period for of the at least two PFLs. Moreover, as indicated in equation (5), a total measurement period may be based on the summation of respective maximum measurement periods for each of one or more sets of PFLs. Thus, according to some embodiments of the method 1300, the at least two PFLs comprise a first set of at least two PFLs, the method further comprises determining a total measurement period based on a summation of the first maximum measurement period with a second maximum measurement period of a second set of at least two PFLs, and the first set of at least two PFLs may be the same as or different than the second set of at least two PFLs. The measurement period may determined based on the assumption that the UE can process PFLs of the same band simultaneously, and/or based on the assumption that the UE can process PFLs of the same Frequency Range (FR) simultaneously. According to some embodiments, the measurement period may be further determined based on the one or more network nodes comprising a transmission/reception point (TRP) and an additional UE. Optionally, the measurement period may be determined as (A) a maximum time for the UE to processing time to process one or more PRS resources from the TRP, (B) a maximum time for the UE to processing time to process one or more PRS resources from the additional UE, or a summation of (A) and (B). Moreover, according to some embodiments, the measurement period may be determined based on the assumption that the UE has dedicated resources for processing process one or more PRS resources from the TRP and process one or more PRS resources from the additional UE such that a time for the UE to process one or more PRS resources from the additional UE is not affected by the UE processing one or more PRS resources from the TRP, and a time for the UE to process the one or more PRS resources from the TRP is not affected by the UE processing the one or more PRS resources from the TRP.

FIG. 14 illustrates an embodiment of a UE 105, which can be utilized as described herein above (e.g., in association with FIGS. 1-13). For example, the UE 105 can perform one or more of the functions of the method shown in FIG. 13. It should be noted that FIG. 14 is meant only to provide a generalized illustration of various components, any or all of which may be utilized as appropriate. It can be noted that, in some instances, components illustrated by FIG. 14 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 14.

The UE 105 is shown comprising hardware elements that can be electrically coupled via a bus 1405 (or may otherwise be in communication, as appropriate). The hardware elements may include a processor(s) 1410 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1410 may comprise one or more processing units, which may be housed in a single integrated circuit (IC) or multiple ICs. As shown in FIG. 14, some embodiments may have a separate DSP 1420, depending on desired functionality. Location determination and/or other determinations based on wireless communication may be provided in the processor(s) 1410 and/or wireless communication interface 1430 (discussed below). The UE 105 also can include one or more input devices 1470, which can include without limitation one or more keyboards, touch screens, touch pads, microphones, buttons, dials, switches, and/or the like; and one or more output devices 1415, which can include without limitation one or more displays (e.g., touch screens), light emitting diodes (LEDs), speakers, and/or the like.

The UE 105 may also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. As such, the wireless communication interface 1430 can include RF circuitry capable of being tuned between an active BWP and one or additional bands having one or more FLs used for PRS signals, as described herein. The wireless communication interface 1430 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna (s) 1432 that send and/or receive wireless signals 1434. According to some embodiments, the wireless communication antenna(s) 1432 may comprise a plurality of discrete antennas, antenna arrays, or any combination thereof. The antenna(s) 1432 may be capable of transmitting and receiving wireless signals using beams (e.g., Tx beams and Rx beams). Beam formation may be performed using digital and/or analog beam formation techniques, with respective digital and/or analog circuitry. The wireless communication interface 1430 may include such circuitry.

Depending on desired functionality, the wireless communication interface 1430 may comprise a separate receiver and transmitter, or any combination of transceivers, transmitters, and/or receivers to communicate with base stations (e.g., ng-eNBs and gNBs) and other terrestrial transceivers, such as wireless devices and access points. This can include, for example, transceiver 1436, which further may comprise RF circuitry capable of tuning to different frequency bands as described herein. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1440. Sensor(s) 1440 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1480 capable of receiving signals 1484 from one or more GNSS satellites using an antenna 1482 (which could be the same as antenna 1432). Positioning based on GNSS signal measurement can be utilized to complement and/or incorporate the techniques described herein. The GNSS receiver 1480 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1480 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1480 is illustrated in FIG. 14 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1410, DSP 1420, and/or a processor within the wireless communication interface 1430 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1410 or DSP 1420.

The UE 105 may further include and/or be in communication with a memory 1460. The memory 1460 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1460 of the UE 105 also can comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the UE 105 (and/or processor(s) 1410 or DSP 1420 within UE 105). In some embodiments, then, such code and/or instructions can be used to configure and/or adapt a general-purpose computer (or other device) to perform one or more operations in accordance with the described methods.

Figure 15:
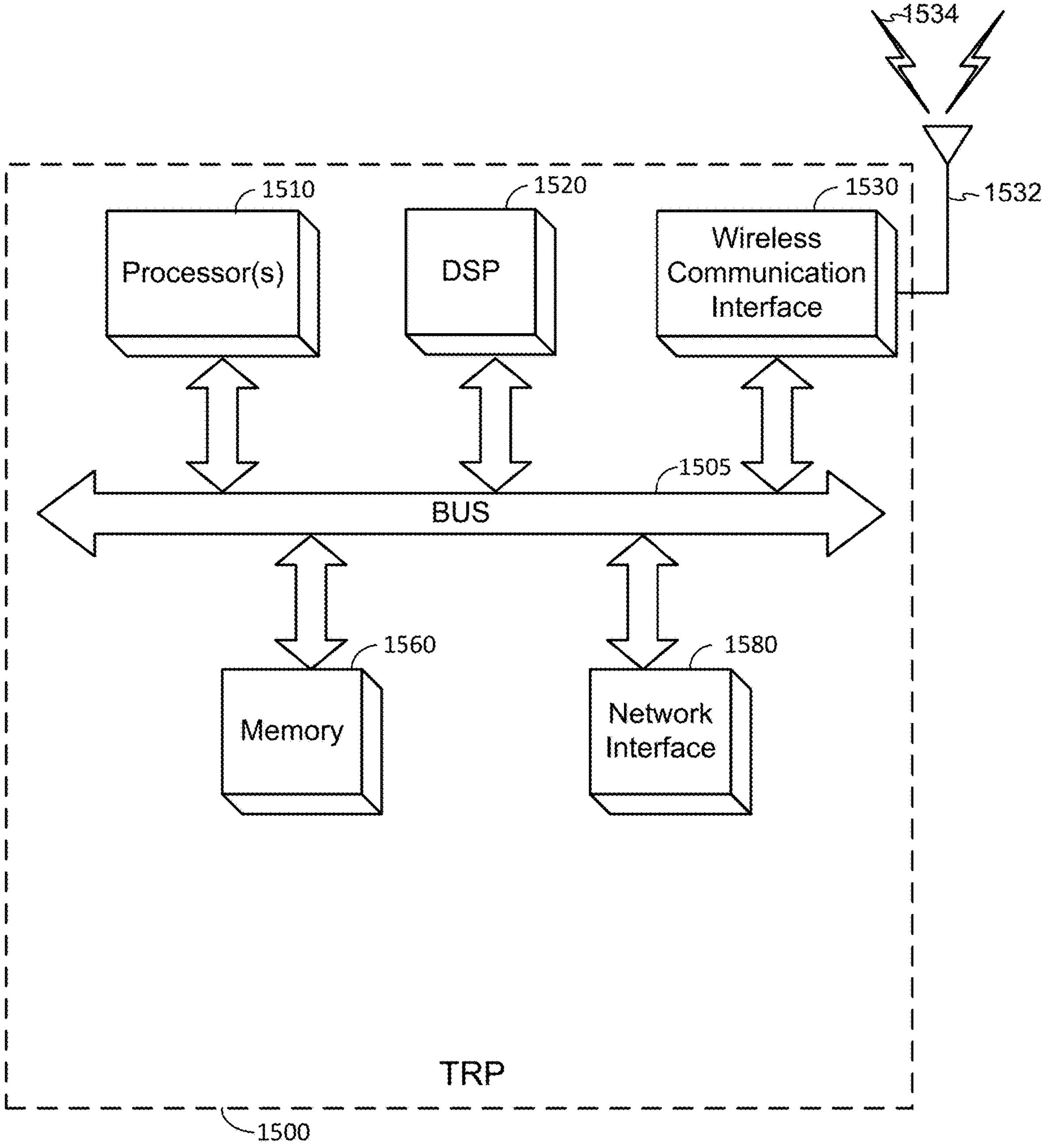
FIG. 15 is a block diagram of a TRP, according to an embodiment.

FIG. 15 illustrates an embodiment of a TRP 1500, which can be utilized as described herein above (e.g., in association with FIGS. 1-13). It should be noted that FIG. 15 is meant only to provide a generalized illustration of various components, any or all of which may be utilized as appropriate.

The TRP 1500 is shown comprising hardware elements that can be electrically coupled via a bus 1505 (or may otherwise be in communication, as appropriate). The hardware elements may include a processor(s) 1510 which can include without limitation one or more general-purpose processors, one or more special-purpose processors (such as DSP chips, graphics acceleration processors, ASICs, and/or the like), and/or other processing structure or means. As shown in FIG. 15, some embodiments may have a separate DSP 1520, depending on desired functionality. Location determination and/or other determinations based on wireless communication may be provided in the processor(s) 1510 and/or wireless communication interface 1530 (discussed below), according to some embodiments. The TRP 1500 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1500 might also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1500 to communicate as described herein. The wireless communication interface 1530 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1532 that send and/or receive wireless signals 1534.

The TRP 1500 may also include a network interface 1580, which can include support of wireline communication technologies. The network interface 1580 may include a modem, network card, chipset, and/or the like. The network interface 1580 may include one or more input and/or output communication interfaces to permit data to be exchanged with a network, communication network servers, computer systems, and/or any other electronic devices described herein.

In many embodiments, the TRP 1500 may further comprise a memory 1560. The memory 1560 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1560 of the TRP 1500 also may comprise software elements (not shown in FIG. 15), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1560 that are executable by the TRP 1500 (and/or processor(s) 1510 or DSP 1520 within TRP 1500). In some embodiments, then, such code and/or instructions can be used to configure and/or adapt a general-purpose computer (or other device) to perform one or more operations in accordance with the described methods.

Figure 16:
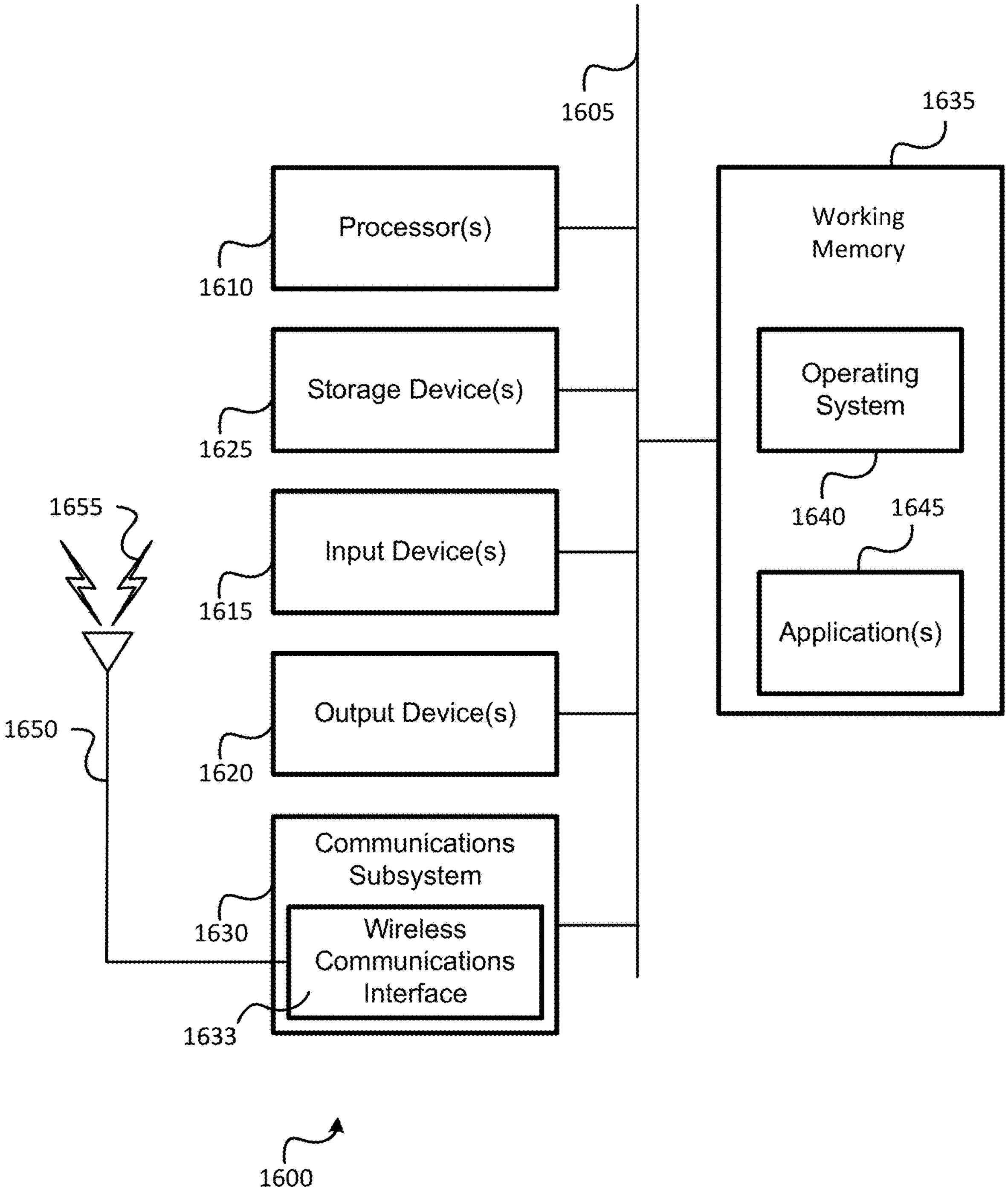
FIG. 16 is a block diagram of an embodiment of a computer system, according to an embodiment.

FIG. 16 is a block diagram of an embodiment of a computer system 1600, which may be used, in whole or in part, to provide the functions of one or more network components as described in the embodiments herein (e.g., location server 160 of FIG. 1, LMF 220 of FIG. 2, etc.). It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner. In addition, it can be noted that components illustrated by FIG. 16 can be localized to a single device and/or distributed among various networked devices, which may be disposed at different geographical locations.

The computer system 1600 is shown comprising hardware elements that can be electrically coupled via a bus 1605 (or may otherwise be in communication, as appropriate). The hardware elements may include processor(s) 1610, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1600 also may comprise one or more input devices 1615, which may comprise without limitation a mouse, a keyboard, a camera, a microphone, and/or the like; and one or more output devices 1620, which may comprise without limitation a display device, a printer, and/or the like.

The computer system 1600 may further include (and/or be in communication with) one or more non-transitory storage devices 1625, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1600 may also include a communications subsystem 1630, which may comprise wireless communication technologies managed and controlled by a wireless communication interface 1633, as well as wired technologies (such as Ethernet, coaxial communications, universal serial bus (USB), and the like). The wireless communication interface 1633 may comprise one or more wireless transceivers may send and receive wireless signals 1655 (e.g., signals according to 5G NR or LTE) via wireless antenna(s) 1650. Thus the communications subsystem 1630 may comprise a modem, a network card (wireless or wired), an infrared communication device, a wireless communication device, and/or a chipset, and/or the like, which may enable the computer system 1600 to communicate on any or all of the communication networks described herein to any device on the respective network, including a User Equipment (UE), base stations and/or other TRPs, and/or any other electronic devices described herein. Hence, the communications subsystem 1630 may be used to receive and send data as described in the embodiments herein.

In many embodiments, the computer system 1600 will further comprise a working memory 1635, which may comprise a RAM or ROM device, as described above. Software elements, shown as being located within the working memory 1635, may comprise an operating system 1640, device drivers, executable libraries, and/or other code, such as one or more applications 1645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1625 described above. In some cases, the storage medium might be incorporated within a computer system, such as computer system 1600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1600 and/or might take the form of source and/or installable code, which, upon compilation and/or installation on the computer system 1600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method at a User Equipment (UE) of measuring Positioning Reference Signal (PRS) measurements using a plurality of Positioning Frequency Layer (PFLs), the method comprising: receiving, from a network entity, a configuration for measuring the PRS measurements; determining a measurement period; tuning radio frequency (RF) circuitry of the UE from an active Bandwidth Part (BWP) to one or more frequency bands of at least two PFLs of the plurality of PFLs; receiving a plurality of PRS resources of the at least two PFLs from one or more network nodes; subsequent to receiving the plurality of PRS resources, re-tuning the RF circuitry of the UE to the active BWP; and determining PRS measurements based at least in part on the plurality of PRS resources of the at least two PFLs and the determined measurement period.

Clause 2. The method of clause 1, wherein receiving the plurality of PRS resources of the at least two PFLs comprises: receiving a first PRS resource of a first PFL during a first set of Orthogonal Frequency-Division Multiplexing (OFDM) symbols in a measurement window; and receiving a second PRS resource of a second PFL during a second set of OFDM symbols in the measurement window.

Clause 3. The method of clause 2 wherein the first PFL is on a first frequency band; subsequent to receiving the first PRS resource and prior to the re-tuning the RF circuitry of the UE to the active BWP, the RF circuitry of the UE is tuned to a second frequency band; and the second PRS resource is received via the second frequency band.

Clause 4. The method of any of clauses 2-3 wherein the first set of OFDM symbols at least partially overlap with the second set of OFDM symbols.

Clause 5. The method of any of clauses 2-4 wherein the measurement window comprises a measurement gap (MG).

Clause 6. The method of clause 1 wherein receiving the plurality of PRS resources of the at least two PFLs comprises receiving a first PRS resource of a first PFL and a second PRS resource of a second PFL during a same set of OFDM symbols in a single measurement window.

Clause 7. The method of any of clauses 1-6 further comprising providing capabilities of the UE to a location server prior to receiving the configuration, wherein the capabilities of the UE are related to measuring the PRS measurements.

Clause 8. The method of clause 7 wherein providing the capabilities of the UE comprise providing an indication of: an ability of the UE to receive multiple PRS resources from multiple PFLs during a single measurement window, a number of PFLs for which the UE can receive PRS resources during a single measurement window, PFLs that can be received by the UE during a common set of OFDM symbols, PFLs that cannot be received by the UE during the common set of OFDM symbols, or one or more frequency bands in which the UE is capable of receiving PRS resources, or any combination thereof.

Clause 9. The method of any of clauses 7-8 further comprising determining the measurement period based on the capabilities of the UE.

Clause 10. The method of any of clauses 1-9 wherein the measurement period comprises a first maximum measurement period of the at least two PFLs.

Clause 11. The method of clause 10 wherein the at least two PFLs comprise a first set of at least two PFLs; the method further comprises determining a total measurement period based on a summation of the first maximum measurement period with a second maximum measurement period of a second set of at least two PFLs; and wherein the first set of at least two PFLs is the same as or different than the second set of at least two PFLs.

Clause 12. The method of any of clauses 1-11 wherein the measurement period is determined based on an assumption that the UE can process PFLs of the same band or Frequency Range (FR) simultaneously.

Clause 13. The method of any of clauses 1-12 wherein the measurement period is determined based on the one or more network nodes comprising a transmission/reception point (TRP) and an additional UE.

Clause 14. The method clause 13 wherein the measurement period is determined as: a maximum time for the UE to process one or more PRS resources from the TRP, a maximum time for the UE to process one or more PRS resources from the additional UE, or a summation of (A) and (B).

Clause 15. The method of any of clauses 13-14 wherein the measurement period is determined based on an assumption that the UE has dedicated resources for processing one or more PRS resources from the TRP and processing one or more PRS resources from the additional UE such that: a time for the UE to process the one or more PRS resources from the additional UE is not affected by the UE processing the one or more PRS resources from the TRP; and a time for the UE to process the one or more PRS resources from the TRP is not affected by the UE processing the one or more PRS resources from the TRP.

Clause 16. The method of clause 7 further comprising receiving, subsequent to providing the capabilities of the UE, an indication of the measurement period from the location server.

Clause 17. The method of any of clauses 1-16 wherein the one or more network nodes comprises at least one TRP and the plurality of PRS resources comprise at least one downlink (DL) PRS resource.

Clause 18. The method of any of clauses 1-17 wherein the one or more network nodes comprises at least one additional UE and the plurality of PRS resources comprise at least one sidelink (SL) PRS resource.

Clause 19. A UE for measuring Positioning Reference Signal (PRS) measurements using a plurality of Positioning Frequency Layer (PFLs), the UE comprising: a transceiver; a memory; and one or more processors communicatively coupled with the transceiver and the memory, wherein the one or more processors are configured to: receive, via the transceiver from a network entity, a configuration for measuring the PRS measurements; determine a measurement period; tuning radio frequency (RF) circuitry of the transceiver from an active Bandwidth Part (BWP) to one or more frequency bands of at least two PFLs of the plurality of PFLs; receive a plurality of PRS resources of the at least two PFLs from one or more network nodes; subsequent to receiving the plurality of PRS resources, re-tuning the RF circuitry of the transceiver to the active BWP; and determine PRS measurements based at least in part on the plurality of PRS resources of the at least two PFLs and the determined measurement period.

Clause 20. The UE of clause 19, wherein, to receive the plurality of PRS resources of the at least two PFLs, the one or more processors are configured to: receive a first PRS resource of a first PFL during a first set of Orthogonal Frequency-Division Multiplexing (OFDM) symbols in a measurement window; and receive a second PRS resource of a second PFL during a second set of OFDM symbols in the measurement window.

Clause 21. The UE of clause 20 wherein the one or more processors are configured to: receive the first PRS resource of the first PFL on a first frequency band; subsequent to receiving the first PRS resource and prior to the re-tuning the RF circuitry of the transceiver to the active BWP, tune the RF circuitry of the transceiver to a second frequency band; and receive the second PRS resource via the second frequency band.

Clause 22. The UE of any of clauses 20-21 wherein the one or more processors are configured to receive the first PRS resource and the second PRS resource such that the first set of OFDM symbols at least partially overlap with the second set of OFDM symbols.

Clause 23. The UE of any of clauses 20-22 wherein the measurement window comprises a measurement gap (MG).

Clause 24. The UE of clause 19 wherein, to receive the plurality of PRS resources of the at least two PFLs, the one or more processors are configured to receive a first PRS resource of a first PFL and a second PRS resource of a second PFL during a same set of OFDM symbols in a single measurement window.

Clause 25. The UE of any of clauses 19-24 wherein the one or more processors are further configured to provide capabilities of the UE to a location server prior to receiving the configuration, wherein the capabilities of the UE are related to measuring the PRS measurements.

Clause 26. The UE of clause 25 wherein, to provide the capabilities of the UE, the one or more processors are configured to provide an indication of an ability of the UE to receive multiple PRS resources from multiple PFLs during a single measurement window, a number of PFLs for which the UE can receive PRS resources during a single measurement window, PFLs that can be received by the UE during a common set of OFDM symbols, PFLs that cannot be received by the UE during the common set of OFDM symbols, or one or more frequency bands in which the UE is capable of receiving PRS resources, or any combination thereof.

Clause 27. The UE of any of clauses 25-26 wherein the one or more processors are further configured to determine the measurement period based on the capabilities of the UE.

Clause 28. The UE of any of clauses 19-27 wherein, to determine the measurement period, the one or more processors are configured to determine a first maximum measurement period of the at least two PFLs.

Clause 29. The UE of clause 28 wherein the at least two PFLs comprise a first set of at least two PFLs; the one or more processors are configured to determine a total measurement period based on a summation of the first maximum measurement period with a second maximum measurement period of a second set of at least two PFLs; and wherein the first set of at least two PFLs is the same as or different than the second set of at least two PFLs.

Clause 30. The UE of clause 19-29 wherein the one or more processors are configured to determine the measurement period based on an assumption that the UE can process PFLs of the same band or Frequency Range (FR) simultaneously.

Clause 31. The UE of any of clauses 19-30 wherein the one or more processors are configured to determine the measurement period based on the one or more network nodes comprising a transmission/reception point (TRP) and an additional UE.

Clause 32. The UE of clause 31 wherein the one or more processors are configured to determine the measurement period as: a maximum time for the UE to process one or more PRS resources from the TRP, a maximum time for the UE to process one or more PRS resources from the additional UE, or a summation of (A) and (B).

Clause 33. The UE of any of clauses 31-32 wherein the one or more processors are configured to determine the measurement period based on an assumption that the UE has dedicated resources for processing process one or more PRS resources from the TRP and process one or more PRS resources from the additional UE such that: a time for the UE to process one or more PRS resources from the additional UE is not affected by the UE processing one or more PRS resources from the TRP; and a time for the UE to process the one or more PRS resources from the TRP is not affected by the UE processing the one or more PRS resources from the TRP.

Clause 34. The UE of clause 25 wherein the one or more processors are further configured to receive, subsequent to providing the capabilities of the UE, an indication of the measurement period from the location server.

Clause 35. The UE of any of clauses 19-34 wherein the one or more network nodes comprises at least one TRP and the plurality of PRS resources comprise at least one downlink (DL) PRS resource.

Clause 36. The UE of any of clauses 19-35 wherein the one or more network nodes comprises at least one additional UE and the plurality of PRS resources comprise at least one sidelink (SL) PRS resource.

Clause 37. An apparatus for measuring Positioning Reference Signal (PRS) measurements at a User Equipment (UE) using a plurality of Positioning Frequency Layer (PFLs), the apparatus comprising: means for receiving, from a network entity, a configuration for measuring the PRS measurements; means for determining a measurement period; means for tuning radio frequency (RF) circuitry of the UE from an active Bandwidth Part (BWP) to one or more frequency bands of at least two PFLs of the plurality of PFLs; means for receiving a plurality of PRS resources of the at least two PFLs from one or more network nodes; subsequent to receiving the plurality of PRS resources, re-tuning the RF circuitry of the UE to the active BWP; and means for determining PRS measurements based at least in part on the plurality of PRS resources of the at least two PFLs and the determined measurement period.

Clause 38. A non-transitory computer-readable medium storing instructions for measuring Positioning Reference Signal (PRS) measurements at a User Equipment (UE) using a plurality of Positioning Frequency Layer (PFLs), the instructions comprising code for: receiving, from a network entity, a configuration for measuring the PRS measurements; determining a measurement period; tuning radio frequency (RF) circuitry of the UE from an active Bandwidth Part (BWP) to one or more frequency bands of at least two PFLs of the plurality of PFLs; receiving a plurality of PRS resources of the at least two PFLs from one or more network nodes; subsequent to receiving the plurality of PRS resources, re-tuning the RF circuitry of the UE to the active BWP; and determining PRS measurements based at least in part on the plurality of PRS resources of the at least two PFLs and the determined measurement period.

Clause 39. A method at a location server for determining a measurement period in which a User Equipment (UE) is to measuring Positioning Reference Signal measurements using a plurality of Positioning Frequency Layer (PFLs), the method comprising: receiving, from the UE, capabilities of the UE related to measuring the PRS measurements; and determining a measurement period in which the UE is to: tune radio frequency (RF) circuitry of the UE from an active Bandwidth Part (BWP) to one or more frequency bands of at least two PFLs of the plurality of PFLs; receive a plurality of PRS resources of the at least two PFLs from one or more network nodes; and subsequent to receiving the plurality of PRS resources, re-tune the RF circuitry of the UE to the active BWP.

Clause 40. The method of clause 39, determining the measurement period comprises determining the UE is to: receive a first PRS resource of a first PFL during a first set of Orthogonal Frequency-Division Multiplexing (OFDM) symbols in a measurement window; and receive a second PRS resource of a second PFL during a second set of OFDM symbols in the measurement window.

Clause 41. The method of any of clauses 39-40 wherein determining the measurement period comprises determining the UE is to receive a first PRS resource of a first PFL and a second PRS resource of a second PFL during a same set of OFDM symbols.

Clause 42. The method of any of clauses 39-41 wherein determining the measurement period comprises determining the UE is to receive the first PRS resource of the first PFL and the second PRS resource of the second PFL during in a single MG.

Clause 43. The method of any of clauses 39-42 wherein receiving the capabilities of the UE related to measuring the PRS measurements comprises receiving an indication of: an ability of the UE to receive multiple PRS resources from multiple PFLs during a single measurement window, a number of PFLs for which the UE can receive PRS resources during a single measurement window, PFLs that can be received by the UE during a common set of OFDM symbols, PFLs that cannot be received by the UE during the common set of OFDM symbols, or one or more frequency bands in which the UE is capable of receiving PRS resources, or any combination thereof.

Clause 44. The method of any of clauses 39-43 wherein the measurement period comprises a first maximum measurement period of the at least two PFLs.

Clause 45. The method of any of clauses 39-44 wherein the at least two PFLs comprise a first set of at least two PFLs; the method further comprises determining a total measurement period based on a summation of the first maximum measurement period with a second maximum measurement period of a second set of at least two PFLs; and wherein the first set of at least two PFLs is the same as or different than the second set of at least two PFLs.

Clause 46. The method of any of clauses 39-45 wherein the measurement period is determined based on an assumption that the UE can process PFLs of the same band simultaneously.

Clause 47. The method of any of clauses 39-46 wherein the measurement period is determined based on an assumption that the UE can process PFLs of the same Frequency Range (FR) simultaneously.

Clause 48. The method of any of clauses 39-47 wherein the measurement period is further determined based on the one or more network nodes comprising a transmission/reception point (TRP) and an additional UE.

Clause 49. The method of any of clauses 39-48 wherein the measurement period is determined as: a maximum time for the UE to process one or more PRS resources from the TRP, a maximum time for the UE to process one or more PRS resources from the additional UE, or a summation of (A) and (B).

Clause 50. The method of any of clauses 39-49 wherein the measurement period is determined based on an assumption that the UE has dedicated resources for processing process one or more PRS resources from the TRP and process one or more PRS resources from the additional UE such that: a time for the UE to process one or more PRS resources from the additional UE is not affected by the UE processing one or more PRS resources from the TRP; and a time for the UE to process the one or more PRS resources from the TRP is not affected by the UE processing the one or more PRS resources from the TRP.

Clause 51. The method of any of clauses 39-50 wherein the one or more network nodes comprises at least one TRP and the plurality of PRS resources comprise at least one downlink (DL) PRS resource.

Clause 52. The method of any of clauses 39-51 wherein the one or more network nodes comprises at least one additional UE and the plurality of PRS resources comprise at least one sidelink (SL) PRS resource.

What is claimed is:

1. A method at a User Equipment (UE) of measuring Positioning Reference Signal (PRS) measurements using a plurality of Positioning Frequency Layer (PFLs), the method comprising:

providing capabilities of the UE to a location server prior to receiving a configuration, wherein the capabilities of the UE are related to measuring the PRS measurements;

receiving, from a network entity, the configuration for measuring the PRS measurements;

determining a measurement period based on the capabilities of the UE;

tuning radio frequency (RF) circuitry of the UE from an active Bandwidth Part (BWP) to one or more frequency bands of at least two PFLs of the plurality of PFLs;

receiving a plurality of PRS resources of the at least two PFLs from one or more network nodes;

subsequent to receiving the plurality of PRS resources, re-tuning the RF circuitry of the UE to the active BWP; and determining PRS measurements based at least in part on the plurality of PRS resources of the at least two PFLs and the determined measurement period, the measurement period comprises a first maximum measurement period of the at least two PFLs.

2. The method of claim 1, wherein receiving the plurality of PRS resources of the at least two PFLs comprises:

receiving a first PRS resource of a first PFL during a first set of Orthogonal Frequency-Division Multiplexing (OFDM) symbols in a measurement window; and receiving a second PRS resource of a second PFL during a second set of OFDM symbols in the measurement window.

3. The method of claim 2, wherein:

the first PFL is on a first frequency band;

subsequent to receiving the first PRS resource and prior to the re-tuning the RF circuitry of the UE to the active BWP, the RF circuitry of the UE is tuned to a second frequency band; and the second PRS resource is received via the second frequency band.

4. The method of claim 2, wherein the first set of OFDM symbols at least partially overlap with the second set of OFDM symbols.

5. The method of claim 2, wherein the measurement window comprises a measurement gap (MG).

6. The method of claim 1, wherein receiving the plurality of PRS resources of the at least two PFLs comprises receiving a first PRS resource of a first PFL and a second PRS resource of a second PFL during a same set of OFDM symbols in a single measurement window.

7. The method of claim 1, wherein providing the capabilities of the UE comprise providing an indication of:

an ability of the UE to receive multiple PRS resources from multiple PFLs during a single measurement window, a number of PFLs for which the UE can receive PRS resources during a single measurement window, PFLs that can be received by the UE during a common set of OFDM symbols, PFLs that cannot be received by the UE during the common set of OFDM symbols, or one or more frequency bands in which the UE is capable of receiving PRS resources, or
any combination thereof.

8. The method of claim 1, wherein:
the at least two PFLs comprise a first set of at least two PFLs;
the method further comprises determining a total measurement period based on a summation of the first maximum measurement period with a second maximum measurement period of a second set of at least two PFLs; and
wherein the first set of at least two PFLs is the same as or different than the second set of at least two PFLs.

9. The method of claim 1, wherein the measurement period is determined based on the one or more network nodes comprising a transmission/reception point (TRP) and an additional UE.

10. The method of claim 9, wherein the measurement period is determined as:
(A) a maximum time for the UE to process one or more PRS resources from the TRP,
(B) a maximum time for the UE to process one or more PRS resources from the additional UE, or
a summation of (A) and (B).

11. The method of claim 9, wherein the measurement period is determined based on an assumption that the UE has dedicated resources for processing one or more PRS resources from the TRP and processing one or more PRS resources from the additional UE such that:
a time for the UE to process the one or more PRS resources from the additional UE is not affected by the UE processing the one or more PRS resources from the TRP; and
a time for the UE to process the one or more PRS resources from the TRP is not affected by the UE processing the one or more PRS resources from the additional UE.

12. The method of claim 1, further comprising receiving, subsequent to providing the capabilities of the UE, an indication of the measurement period from the location server.

13. The method of claim 1, wherein the one or more network nodes comprises at least one TRP and the plurality of PRS resources comprise at least one downlink (DL) PRS resource.

14. The method of claim 1, wherein the one or more network nodes comprises at least one additional UE and the plurality of PRS resources comprise at least one sidelink (SL) PRS resource.

15. A UE for measuring Positioning Reference Signal (PRS) measurements using a plurality of Positioning Frequency Layer (PFLs), the UE comprising:
a transceiver;
a memory; and
one or more processors communicatively coupled with the transceiver and the memory, wherein the one or more processors are configured to:
provide capabilities of the UE to a location server prior to receiving a configuration, wherein the capabilities of the UE are related to measuring the PRS measurements;
receive, via the transceiver from a network entity, the configuration for measuring the PRS measurements;
determine a measurement period based on the capabilities of the UE;
tuning radio frequency (RF) circuitry of the transceiver from an active Bandwidth Part (BWP) to one or more frequency bands of at least two PFLs of the plurality of PFLs;
receive a plurality of PRS resources of the at least two PFLs from one or more network nodes;
subsequent to receiving the plurality of PRS resources, re-tuning the RF circuitry of the transceiver to the active BWP; and
determine PRS measurements based at least in part on the plurality of PRS resources of the at least two PFLs and the determined measurement period, wherein the measurement period comprises a first maximum measurement period of the at least two PFLs.

16. The UE of claim 15, wherein, to receive the plurality of PRS resources of the at least two PFLs, the one or more processors are configured to:
receive a first PRS resource of a first PFL during a first set of Orthogonal Frequency-Division Multiplexing (OFDM) symbols in a measurement window; and
receive a second PRS resource of a second PFL during a second set of OFDM symbols in the measurement window.

17. The UE of claim 16, wherein the one or more processors are configured to:
receive the first PRS resource of the first PFL on a first frequency band;
subsequent to receiving the first PRS resource and prior to the re-tuning the RF circuitry of the transceiver to the active BWP, tune the RF circuitry of the transceiver to a second frequency band; and
receive the second PRS resource via the second frequency band.

18. The UE of claim 16, wherein the one or more processors are configured to receive the first PRS resource and the second PRS resource such that the first set of OFDM symbols at least partially overlap with the second set of OFDM symbols.

19. The UE of claim 15, wherein, to receive the plurality of PRS resources of the at least two PFLs, the one or more processors are configured to receive a first PRS resource of a first PFL and a second PRS resource of a second PFL during a same set of OFDM symbols in a single measurement window.

20. The UE of claim 15, wherein:
the at least two PFLs comprise a first set of at least two PFLs;
the one or more processors are configured to determine a total measurement period based on a summation of the first maximum measurement period with a second maximum measurement period of a second set of at least two PFLs; and
wherein the first set of at least two PFLs is the same as or different than the second set of at least two PFLs.

21. The UE of claim 15, wherein the one or more processors are configured to determine the measurement period based on the one or more network nodes comprising a transmission/reception point (TRP) and an additional UE.

22. The UE of claim 15, wherein the one or more processors are further configured to receive, subsequent to providing the capabilities of the UE, an indication of the measurement period from the location server.

23. An apparatus for measuring Positioning Reference Signal (PRS) measurements at a User Equipment (UE) using a plurality of Positioning Frequency Layer (PFLs), the apparatus comprising:

means for providing capabilities of the UE to a location server prior to receiving a configuration, wherein the capabilities of the UE are related to measuring the PRS measurements;

means for receiving, from a network entity, the configuration for measuring the PRS measurements;

means for determining a measurement period based on the capabilities of the UE;

means for tuning radio frequency (RF) circuitry of the UE from an active Bandwidth Part (BWP) to one or more frequency bands of at least two PFLs of the plurality of PFLs;

means for receiving a plurality of PRS resources of the at least two PFLs from one or more network nodes;

means for re-tuning the RF circuitry of the UE to the active BWP subsequent to receiving the plurality of PRS resources; and means for determining PRS measurements based at least in part on the plurality of PRS resources of the at least two PFLs and the determined measurement period, wherein the measurement period comprises a first maximum measurement period of the at least two PFLs.

24. A non-transitory computer-readable medium storing instructions for measuring Positioning Reference Signal (PRS) measurements at a User Equipment (UE) using a plurality of Positioning Frequency Layer (PFLs), the instructions comprising code for:

providing capabilities of the UE to a location server prior to receiving a configuration, wherein the capabilities of the UE are related to measuring the PRS measurements;

receiving, from a network entity, the configuration for measuring the PRS measurements;

determining a measurement period based on the capabilities of the UE;

tuning radio frequency (RF) circuitry of the UE from an active Bandwidth Part (BWP) to one or more frequency bands of at least two PFLs of the plurality of PFLs;

receiving a plurality of PRS resources of the at least two PFLs from one or more network nodes;

subsequent to receiving the plurality of PRS resources, re-tuning the RF circuitry of the UE to the active BWP; and determining PRS measurements based at least in part on the plurality of PRS resources of the at least two PFLs and the determined measurement period, wherein the measurement period comprises a first maximum measurement period of the at least two PFLs.

* * * * *